United States Patent [19]
Wallace et al.

[11] Patent Number: 6,018,799
[45] Date of Patent: Jan. 25, 2000

[54] METHOD, APPARATUS AND COMPUTER PROGRAM PRODUCT FOR OPTIMIZING REGISTERS IN A STACK USING A REGISTER ALLOCATOR

[75] Inventors: David R. Wallace, San Francisco; David M. Cox, Livermore, both of Calif.; Serguei V. Morosov, Novosibirsk, Russian Federation; David A. Seberger, Livermore, Calif.; Serguei L. Wenitsky, Novosibirsk, Russian Federation

[73] Assignee: Sun Microsystems, Inc., Palo Alto, Calif.

[21] Appl. No.: 09/121,167

[22] Filed: Jul. 22, 1998

[51] Int. Cl.[7] .................. G06F 9/34; G06F 12/04
[52] U.S. Cl. .............. 712/300; 712/210; 712/204; 712/202; 711/212; 711/132; 711/206
[58] Field of Search .................. 712/210, 226, 712/300, 1, 229, 202, 222, 204; 708/525, 211, 670, 212, 190, 518; 395/707; 710/127; 711/212, 132, 206

[56] References Cited

U.S. PATENT DOCUMENTS

| | | | |
|---|---|---|---|
| 5,276,891 | 1/1994 | Patel | 712/300 |
| 5,634,118 | 5/1997 | Blomgren | 712/226 |
| 5,898,850 | 4/1999 | Dickol et al. | 712/229 |

OTHER PUBLICATIONS

"Floating–Point Unit", Intel Architecture Software Developer's Manual, vol. 1: Basic Architecture, Chapter 7, 1997.
"Optimization Techniques for Floating–Point Applications", Intel Architecture Optimization Manual, Chapter 5, 1997.
Alfred V. Aho et al., "Compilers: Principles, Techniques and Tools," Addison–Wesley Publishing Co., 1988, pp.608–633.
Alfred V. Aho et al., "Compilers: Principles, Techniques and Tools," Addison–Wesley Publishing Co., 1988, Chapters 8,9 and 10, pp. 463–722.
G.J. Chaitin, Register Allocation & Spilling via Graph Coloring, Proceedings of the SIGPLAN '82 Symposium on Compiler Construction, Jun. 1982, pp. 98–105.

*Primary Examiner*—Daniel H. Pan
*Attorney, Agent, or Firm*—Skjerven, Morrill, MacPherson, Franklin & Friel, LLP; Michael Shenker

[57] ABSTRACT

Apparatus, methods and computer program products are disclosed that enable a compiler to generate efficient code to access stack registers on a register stack. The invention operates by transforming a three-operand instruction, within a compiler's intermediate representation, to one or more fewer-than-three-operand instructions. The invention also transforms the instruction's operand addressing from an access to a pseudo-named register to an access to a stack register through stack offset into a register stack. The invention also determines the register stack state at each instruction responsive to register stack permutations and maps the stack offset accordingly for each subsequent access to a stack register.

44 Claims, 13 Drawing Sheets

METHOD, APPARATUS AND COMPUTER PROGRAM PRODUCT FOR OPTIMIZING REGISTERS IN A STACK USING A REGISTER ALLOCATOR

BACKGROUND OF THE INVENTION

1. Field of the Invention

This invention relates to the field of optimizing compilers for computer systems. Specifically, this invention is a new and useful optimization method, apparatus and computer program product for optimizing computations using a register stack instead of named registers.

2. Background

Many modern computer architectures use names to identify specific registers. Optimizing compilers have developed many techniques to optimize the use of such named registers. Some computer architectures also use a register stack for some registers. Intel® processors use a register stack for floating point operations. This register stack organization is described by Chapter 7 of *Intel Architecture Software Developer's Manual: Basic Architecture,* order number 243190, ©1996, 1997, hereby incorporated by reference in its entirety. Floating point optimization techniques for the Intel FPU are provided in Chapter 5 of *Intel Architecture Optimization Manual,* order number 242816-003, ©1996, 1997, hereby incorporated by reference in its entirety.

The mainstream development of compiler register allocation technology deals with registers with fixed names and not with stack registers. This existing technology does not deal with register stacks because as operations are performed on the register stack the values kept in the stack registers move around within the register stack.

It would be advantageous to provide a method, apparatus and program product that applies the prior art register allocation technology that deals with fixed-name registers to registers organized as a register stack.

SUMMARY OF THE INVENTION

The present invention improves optimizing compilers that generate computer instructions directed toward a target computer that includes a register stack. The invention discloses a method that uses pseudo-registers with fixed names for many of the compiler's optimization phases. Then at a later phase, the instructions that use the pseudo-registers are modified to use the stack registers instead. Permutations of the register stack caused by the operation of instructions that do push and pop stack operations are tracked by a register stack state that maps the pseudo-registers to stack registers. Stack registers are referenced by their offsets into the register stack.

One aspect of the invention is a computer controlled method for efficiently employing a register stack, having a plurality of stack registers, within a target computer architecture. The method generates a plurality of instructions without push or pop operations whose operands are one or more pseudo-registers with fixed names instead of the plurality of stack registers actually implemented in the target computer architecture. The method also transforms the plurality of instructions into a plurality of new instructions. The plurality of new instructions have an operand format corresponding to that of the target computer architecture's instructions. For instance, three-operand instructions with two source operands and a target operand are transformed to two-operand instructions with a shared source and target. The method also includes the step analyzing the plurality of new instructions to determine lifetime information for the one or more pseudo-registers. The method eliminates dead values by using the lifetime information to introduce one or more pop operations into the plurality of new instructions. Additionally, the method initializes a mapping means from the one or more pseudo-registers to the plurality of stack registers. The method also performs the following computer controlled steps for each of the plurality of new instructions: The step of replacing within the new instruction the one or more pseudo-registers with one or more of the plurality of stack registers by using the mapping means; and the step of updating the mapping means to reflect the stack effects on the mapping of the new instruction. Thus, the method uses known techniques to generate instructions with fixed register names that are used to generate instructions that use the plurality of stack registers.

Another aspect of the invention is an apparatus having a central processing unit (CPU) and a memory coupled to the CPU for efficiently employing a register stack that has a plurality of stack registers within a target computer architecture. The apparatus includes an instruction generation mechanism that is configured to generate a plurality of instructions, without push or pop operations, whose operands are one or more pseudo-registers with fixed names instead of the plurality of stack registers actually implemented in the target computer architecture. The apparatus also include an instruction transformation mechanism that is configured to transform the plurality of instructions into a plurality of new instructions. The plurality of new instructions have an operand format corresponding to that of the target computer architecture's instructions. For instance, three-operand instructions with two source operands and a target operand are transformed to two-operand instructions with a shared source and target. In addition, the apparatus includes an instruction analysis mechanism that is configured to analyze the plurality of new instructions to determine lifetime information for the one or more pseudo-registers. Dead values are eliminated by a dead value elimination mechanism that is configured to use the lifetime information to introduce one or more pop operations into the plurality of new instructions. In addition, the apparatus includes an initialization mechanism that is configured to initialize a mapping means from the one or more pseudo-registers to the plurality of stack registers. The apparatus also includes a pseudo-register conversion mechanism that is configured to convert each of the plurality of new instructions. The pseudo-register conversion mechanism further comprises: an operand replacement mechanism that is configured to use the mapping means to replace, within the new instruction, the one or more pseudo-registers with one or more of the plurality of stack registers and an adjustment mechanism that is configured to update the mapping means to reflect the stack effects on the mapping of the new instruction. Thus, the apparatus incorporates known techniques, used to generate instructions with fixed register names, to generate instructions that use the plurality of stack registers.

Another aspect of the invention is a computer program product that includes a computer usable storage medium that has computer readable code embodied therein. When executed on a computer, the computer readable code causes the computer to efficiently employ a register stack that has a plurality of stack registers within a target computer architecture. When executed on a computer, the computer readable code causes a computer to effect an instruction transformation mechanism, an instruction analysis mechanism, a dead value elimination mechanism, an initialization mechanism, a pseudo-register conversion mechanism, an operand replacement mechanism, and an adjustment mechanism. Each of these mechanisms having the same functions as the corresponding mechanisms for the previously described apparatus.

Another aspect of the invention is a computer controlled method for optimizing a target program directed to a target computer architecture. The target computer architecture includes a register stack that has a plurality of stack registers. The method includes the step of assigning one or more pseudo-registers to the plurality of stack registers. Another step is that of maintaining a register stack state that maps the allocated pseudo-registers to the plurality of stack registers using a plurality of stack offsets. The register stack state is responsive to changes of the register stack. The method also converts an instruction that references one of the allocated pseudo-registers to use one of the plurality of stack offsets. Converting the instruction to use one of the plurality of stack offsets causes the instruction to specify one of the plurality of stack registers in accordance with the register stack state.

Still another aspect of the invention is an apparatus having a central processing unit (CPU) and a memory coupled to the CPU for optimizing a target program directed to a target computer architecture. The target computer architecture includes a register stack that has a plurality of stack registers. The apparatus includes a register assignment mechanism that is configured to assign one or more pseudo-registers to the plurality of stack registers. In addition, the apparatus includes a maintenance mechanism that is configured to maintain a register stack state. The register stack state maps the allocated pseudo-registers to the plurality of stack registers using a plurality of stack offsets. The register stack state is responsive to changes of the register stack. The apparatus also includes an instruction reference conversion mechanism that is configured to convert an instruction that references one of the allocated pseudo-registers to use one of the plurality of stack offsets. The converted instruction operand specifies one of the plurality of stack registers in accordance with the register stack state.

Another aspect of the invention is a computer program product that includes a computer usable storage medium that has computer readable code embodied therein. When executed on a computer, the computer readable code causes the computer to optimize a target program directed to a target computer architecture that includes a register stack that has a plurality of stack registers. When executed on a computer, the computer readable code causes a computer to effect a register assignment mechanism, a maintenance mechanism, and an instruction reference conversion mechanism. Each of these mechanisms having the same functions as the corresponding mechanisms for the previously described apparatus.

Another aspect of the invention is a computer controlled method for efficiently employing a register stack that has a plurality of stack registers within a target computer architecture. The method includes the step of transforming a three-operand instruction to one or more fewer-than-three-operand instructions. The method also analyzes the one or more fewer-than-three-operand instructions to determine lifetime information for one or more pseudo-registers. In addition, the method includes the step of inserting a pop operation into the one or more fewer-than-three-operand instructions dependant on the lifetime information. The operand addresses are transformed from the allocated pseudo-registers to offsets in the register stack to address the plurality of stack registers.

Another aspect of the invention is an apparatus, having a central processing unit (CPU) and a memory coupled to the CPU, for compiling a target program for a target computer architecture. The target computer architecture employs a register stack that has a plurality of stack registers. The apparatus includes an instruction transformation mechanism that is configured to transform a three-operand instruction to one or more fewer-than-three-operand instructions. The apparatus also includes an address transformation mechanism that is configured to transform operand addresses contained in the one or more fewer-than-three-operand instructions from one or more pseudo-registers to offsets in the register stack to address the plurality of stack registers.

Yet a further aspect of the invention is a computer program product that includes a computer usable storage medium that has computer readable code embodied therein. When executed on a computer, the computer readable code causes the computer to compile a target program for a target computer architecture. The target computer architecture employs a register stack that has a plurality of stack registers. When executed on a computer, the computer readable code causes a computer to effect an instruction transformation mechanism and an address transformation mechanism. Each of these mechanisms having the same functions as the corresponding mechanisms for the previously described apparatus.

A discussion of live-variable analysis can be found in *Compilers: Principles, Techniques and Tools* by Alfred V. Aho, Ravi Sethi and Jeffrey D. Ullman, Addison-Wesley Publishing Co. 1988, ISBN 0-201-10088-6, at pages 608–633 hereby incorporated by reference in its entirety.

The foregoing and many other aspects of the present invention will become obvious to those of ordinary skill in the art after having read the following detailed description of the preferred embodiments that are illustrated in the various drawing figures.

DESCRIPTION OF THE PREFERRED EMBODIMENTS

Figure 1:
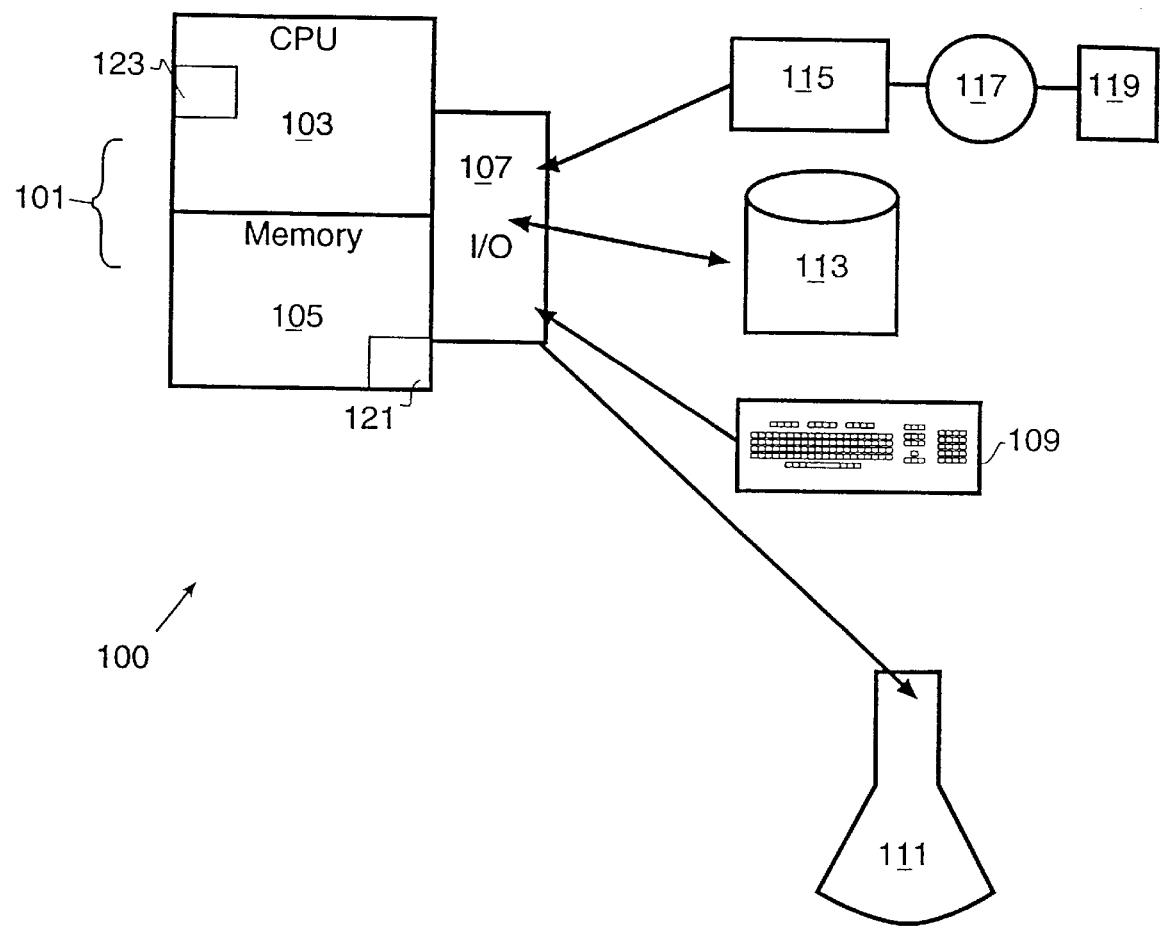
FIG. 1 illustrates a computer system capable of using the invention in accordance with a preferred embodiment.

The invention uses a computer. Some of the elements of a computer, as indicated by general reference character 100, configured to support the invention are shown in FIG. 1 wherein a processor 101 is shown, having a central processor unit (CPU) 103, a memory section 105 and an input/output (I/O) section 107. The I/O section 107 is connected to a keyboard 109, a display unit 111, a disk storage unit 113 and a CD-ROM drive unit 115. The CD-ROM drive unit 115 can read a CD-ROM medium 117 that typically contains a program and data 119. The memory section 105 contains an executing program 121 that causes the computer 100 to perform the inventive steps. The computer may also contain a register stack 123 that contains a number of stack registers addressed via stack offsets. In a preferred embodiment, the register stack 123 operates in accordance with Intel's floating point unit architecture. The disk storage unit 113 and the CD-ROM drive unit 115, along with the CD-ROM medium 117, comprise a file storage mechanism. Such a computer system is capable of executing applications that embody the invention. One skilled in the art will understand that the computer system illustrated in FIG. 1 includes devices that may not be needed for each embodiment of the invention. In particular, the register stack 123 need not be included in the same computer that includes the executing program 121.

Figure 2:
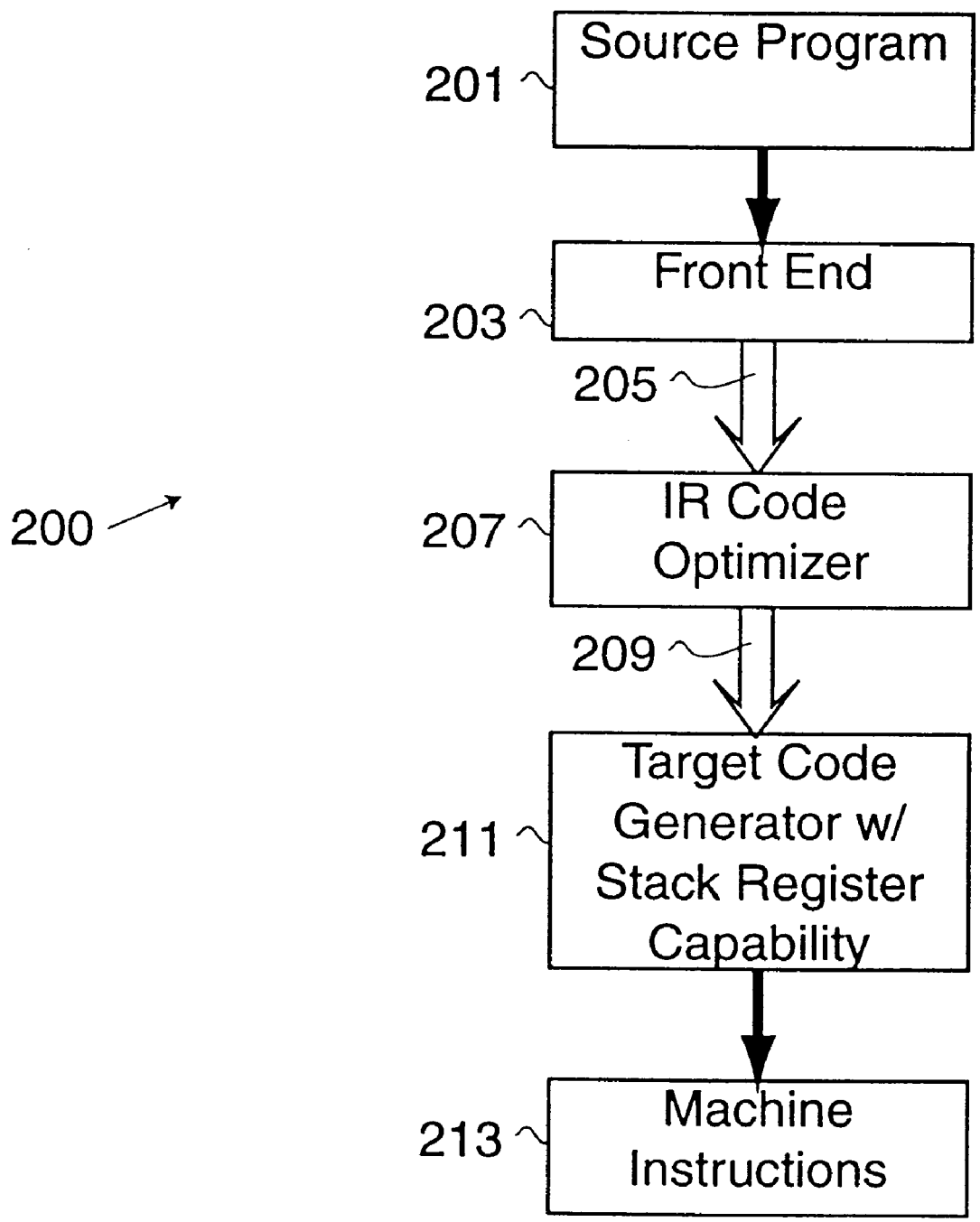
FIG. 2 illustrates a compiler in accordance with a preferred embodiment.

FIG. 2 illustrates a compiler architecture, indicated by general reference character 200, that uses the invention. A compiler that is implemented according to the compiler architecture 200 consumes a target program's source information 201 by a compiler front-end segment 203. The compiler front-end segment 203 processes the syntax and semantics of the target program's source information 201 according to the rules of the programming language applicable to the target program's source information 201. The compiler front-end segment 203 generates at least one version of an 'intermediate' code representation 205 of the target program's source information 201. The intermediate representation (IR) generally includes data structures that either represent, or can be used to create, control flow graphs (CFGs). A CFG is used to represent the flow of control between the basic blocks in the program. Basic blocks do not contain any control flow structures, functions, procedures, or other constructs that change the flow of execution within the basic block. Basic blocks have only one entry point and one exit point.

The 'intermediate' code representation 205 is then optimized by an intermediate representation optimizer segment 207. The intermediate representation optimizer segment 207 operates on, and adjusts the 'intermediate' code representation 205 of the target program's source information 201 to optimize the execution of a program in a variety of ways well understood in the art. The intermediate representation optimizer segment 207 generates an optimized intermediate representation 209. A code generator segment 211 (that includes aspects of the invention) consumes the optimized intermediate representation 209, performs low level optimizations, allocates physical registers and generates an assembler source code and/or object code module 213 from the optimized intermediate representation 209. The object code comprises binary computer instructions (opcodes) in an object module. The assembler source code is a series of symbolic statements in an assembler source language. Both the assembler source code and the object code are targeted to a particular computer architecture (for example, the Intel Pentium architecture).

As mentioned above, the code generator segment 211 performs low level optimizations and generates either (or both) object code (often in the form of object modules) or assembler source code. The optimized intermediate representation 209 of the program generally references virtual registers with fixed names. That is, the intermediate representation optimizer segment 207 assumes that the target computer contains an unlimited number of named virtual registers. During the operation of the code generator segment 211, these virtual registers are assigned to the target computer's physical registers. This resource management is performed in the code generator segment 211 by a register allocation phase or process. One aspect of the register allocation process is that the contents of the physical registers are often "spilled" to memory at various points during the execution of the program so that the limited number of the physical registers can be used to hold values of more immediate relevance to the program at those various points. Those values that are spilled to memory are often restored to the physical registers when the program advances to different points of execution. The register allocation process determines which physical registers are used in the basic block.

A general discussion of optimizing compilers and the related techniques used can be found in *Compilers: Principles, Techniques and Tools* by Alfred V. Aho, Ravi Sethi and Jeffrey D. Ullman, Addison-Wesley Publishing Co. 1988, ISBN 0-201-10088-6, in particular chapters 8, 9 and 10, pages 463–723 hereby incorporated by reference in its entirety (hereinafter referenced as Aho). Additional information related to register allocation and of spilling values to memory is provided by *Register Allocation & Spilling via Graph Coloring,* by G. J. Chaitin, ©1982, Proceedings of the SIGPLAN '82 Symp. On Compiler Construction, June 1982, pp. 98–105 hereby incorporated by reference in its entirety.

Now, some machines have their physical registers organized as a stack—so these registers cannot be referenced with fixed names.

One aspect of the invention is that a set of pseudo-registers with fixed names is used up to and through the register allocation phase so that these pseudo-registers are treated as if they were real physical registers. Thus, the intermediate representation optimization phases of the compiler use existing mechanisms to optimize the pseudo-registers irrespective that the pseudo-registers will be later replaced with stack registers. Thus, traditional register allocation and spilling operations (and many other code generation and optimization operations) are applied to the pseudo-registers. The number of pseudo-registers is no more than the number of stack registers. The actual replacement of the pseudo-registers by the stack registers is accomplished by aspects of the invention that are invoked after the compiler performs register assignments.

A preferred embodiment is directed toward a target computer that uses the Intel FPU architecture (or equivalent). The Intel FPU architecture uses computer floating point instructions that use no more than two-operands and a floating point register stack. One skilled in the art will understand from the appended figures and accompanying text that this invention can be used to optimize access to registers within any register stack and is not limited to floating-point architectures.

The following description provides an overview of the invention's operation. Subsequent descriptions expand the details of the operation. These descriptions are directed toward an Intel compatible FPU architecture. One skilled in the art will understand that the disclosed invention can be applied to other register stack based architectures.

Figure 3:
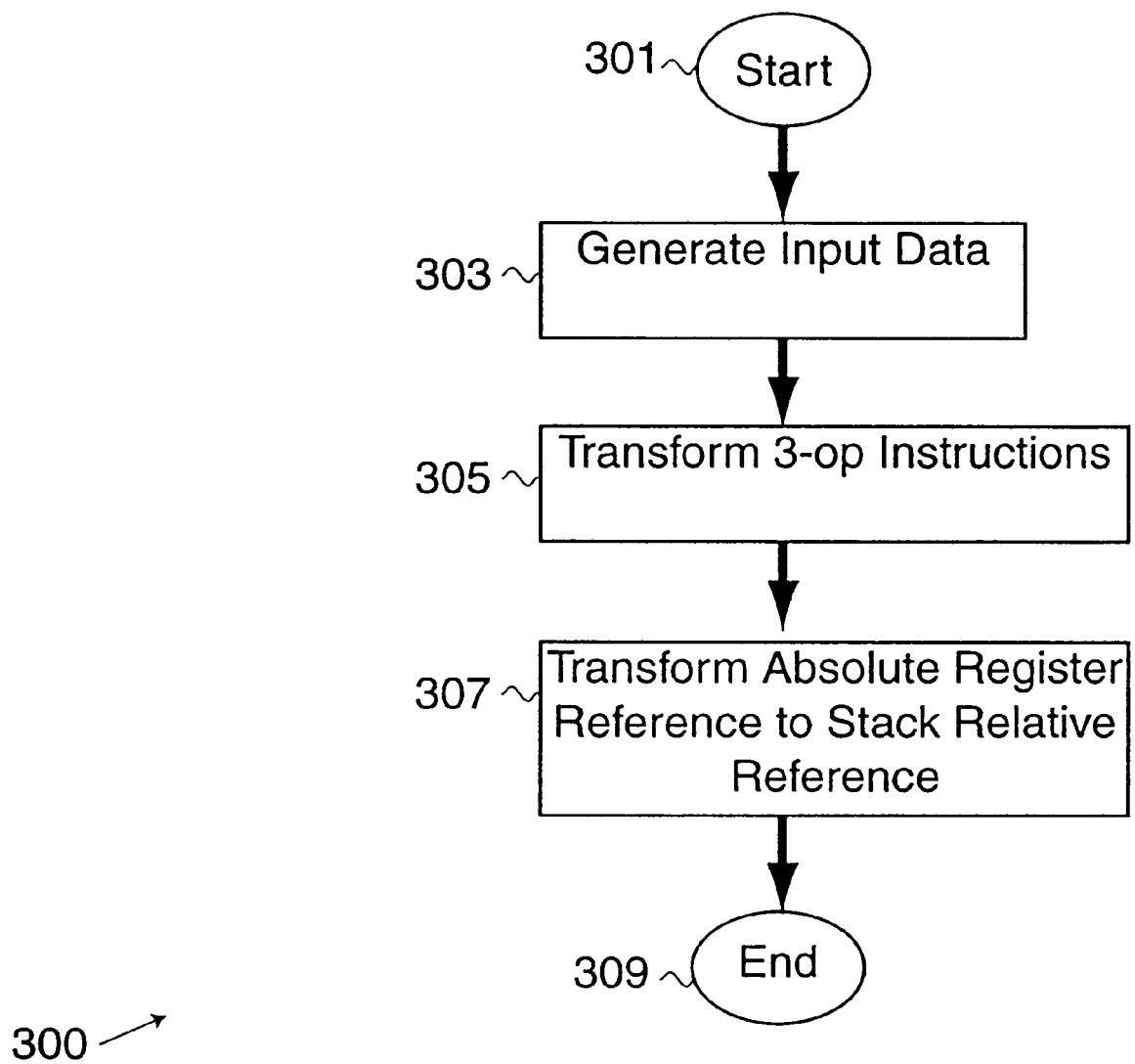
FIG. 3 illustrates an overview of a stack register replacement process in accordance with a preferred embodiment.

FIG. 3 provides an overview of a stack register replacement process, indicated by general reference character 300, for assigning pseudo-registers to stack registers in a register stack. The stack register replacement process 300 is invoked in the compiler after virtual registers have been assigned to pseudo-registers.

The stack register replacement process 300 initiates at a 'start' terminal 301 and continues to a 'generate input data' procedure 303. The 'generate input data' procedure 303 generates a control flow graph (CFG) of the relevant portion of the program being compiled, basic block representations related to the CFG and an intermediate representation of the compiled instructions. Some, or all, of the input data may be generated by prior portions of the compiler. Next, the IR is modified by a 'transform instruction' procedure 305 that transforms the IR from a three-operand form (generally with two source operands and one target operand) into a fewer-than-three-operand form that correspond to the instruction formats in the Intel architecture. The 'transform instruction' procedure 305 is subsequently described with respect to FIG. 4A. Next, a 'transform absolute register reference to stack relative reference' procedure 307 converts the pseudo-register addressing used in the IR instruction's operand to register stack relative addressing. The 'transform absolute register reference to stack relative reference' procedure 307 is subsequently described with respect to FIG. 5A. Finally, the stack register replacement process 300 completes through an 'end' terminal 309.

Figure 4A:
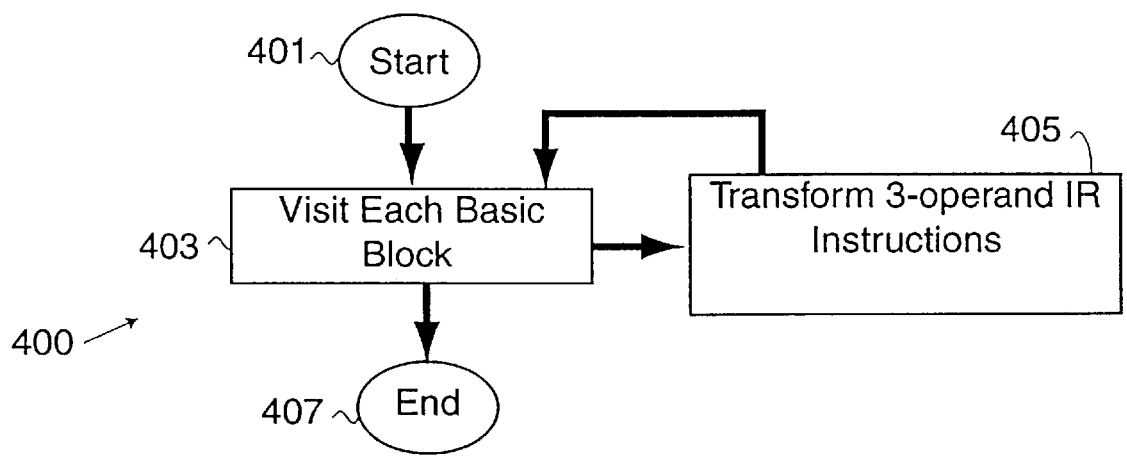
FIG. 4A illustrates an overview of an IR three-operand instruction transformation process in accordance with a preferred embodiment.

FIG. 4A illustrates an IR instruction transformation process, indicated by general reference character 400, for transforming the three-operand form of the IR to Intel format instructions having fewer operands. The process 400 is invoked by the 'transform instruction' procedure 305 of FIG. 3. The process 400 initiates at a 'start' terminal 401 and continues to a 'visit each basic block' procedure 403. The 'visit each basic block' procedure 403 visits (iterates) each basic block in the CFG. Each of the iterated basic blocks are processed by a 'transform three-operand' procedure 405 that is subsequently described with respect to FIG. 4B. After each basic block has been visited, the process 400 completes through an 'end' terminal 407.

Figure 4B:
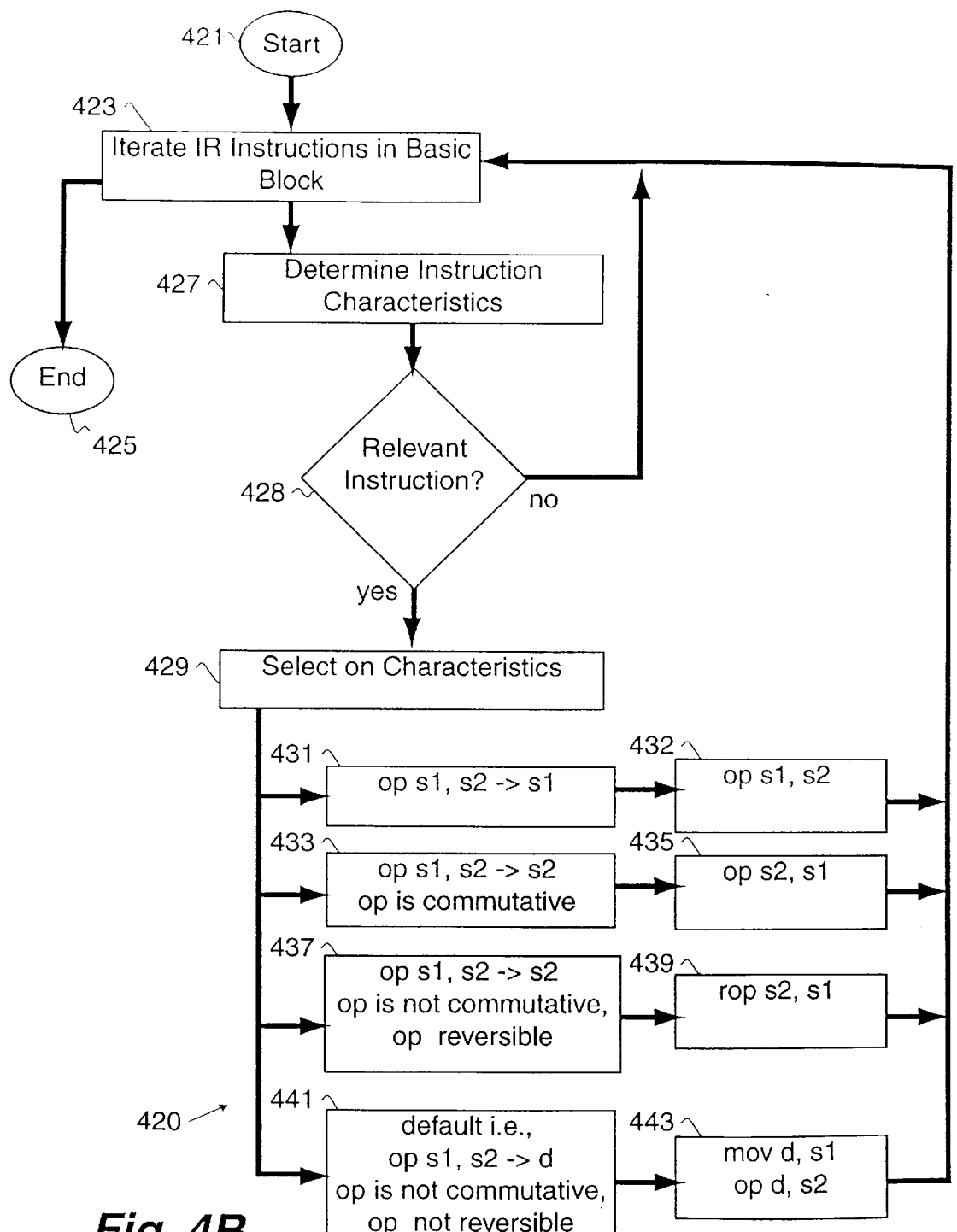
FIG. 4B illustrates a detailed IR three-operand instruction transformation process in accordance with a preferred embodiment.

The IR instructions generally are in a three-operand format with two source operands and one target operand each of which can be different. Thus, for an Intel compatible floating point architecture, the IR in each basic block is modified, as is described with respect to FIG. 4B, to transform any three-operand floating-point IR instruction to an IR instruction with Intel instruction format having fewer than three-operands or a sequence of IR instructions that have fewer than three-operands. A three-operand instruction is one that specifies two sources that can be independent of a destination (for example, op R1, R2→R3; where if op is a subtraction, R2 is subtracted from R1 and the result is stored in R3). An Intel format two-operand instruction uses two sources and leaves the result in one of the source registers—destroying its original value (for example, op R1, R2; where if op is a subtraction, R2 is subtracted from R1 leaving the result in R1). Some instructions (for example, the Intel floating point square root instruction) operate on a single source and overwrite that source with the result (for example, op R1). An IR three-operand instruction can be transformed into an Intel format by using a move instruction and a two-operand instruction (for example, op R1, R2→R3 transforms to: move R3, R1; op R3, R2). FIG. 4B shows how these transformations are accomplished.

FIG. 4B illustrates an IR instruction transformation process, indicated by general reference character 420, that is invoked by the 'transform three-operand' procedure 405 of FIG. 4A. The process 420 initiates at a 'start' terminal 421 and continues to an 'iterate IR instructions' procedure 423. The 'iterate IR instructions' procedure 423 iterates each instruction in the basic block. When all instructions in the basic block have been processed, the process 420 completes through an 'end' terminal 425.

Each IR instruction in the basic block (the basic block was iterated by the 'visit each basic block' procedure 403) is examined by a 'determine instruction characteristics' procedure 427 that obtains the characteristics of the IR instruction. These characteristics include the type of instruction, the number of operands used by the IR instruction, and the position of the source and destination operands. Next, a 'relevant instruction' decision procedure 428 examines the characteristics determined by the 'determine instruction characteristics' procedure 427 and if the instruction type indicates that the IR instruction will not reference one of the pseudo-registers (that is, the IR instruction is not relevant), the process 420 returns to the 'iterate IR instructions' procedure 423 to process the next IR instruction. However, if the IR instruction is relevant (that is, it does reference one of the pseudo-registers), the process 420 continues to a 'select on characteristics' procedure 429.

The 'select on characteristics' procedure 429 examines the IR instruction opcode and its operands to determine the possible IR instruction conversion. An 'in-order' selection procedure 431 determines whether the IR instruction stores its result in the instruction's first operand. If this condition holds, the process 420 continues to a 'basic transformation' procedure 432 that transforms the three-operand form of the instruction to the appropriate Intel format fewer-than-three-operand form. The process 420 then continues the iteration at the 'iterate IR instructions' procedure 423.

An 'out-of-order, commutative' selection procedure 433 determines whether the IR instruction stores its result in the instruction's second operand and whether the operation is conmmutative. If so, the process 420 continues to a 'switch operand order' procedure 435 that transforms the three-operand form of the instruction to the appropriate Intel format fewer-than-three-operand form while switching the order of the operands in the instruction. The process 420 then continues the iteration at the 'iterate IR instructions' procedure 423.

An 'out-of-order, non-commutative, reversible-op' selection procedure 437 determines whether the IR instruction stores its result in the instruction's second operand and whether the operation is not commutative. If so, the process 420 continues to a 'replace opcode with reverse opcode' procedure 439 that transforms the three-operand form of the instruction to the appropriate reverse two-operand form (for example, "subtract R1, R2→R2" (to subtract R2 from R1 leaving the result in R2) is converted to "rsubtract R2, R1"). The process 420 then continues the iteration at the 'iterate IR instructions' procedure 423.

A 'default' procedure 441 is used when the previous cases do not apply. In this circumstance, the process 420 continues to an 'expand instruction' procedure 443 that copies an appropriate source to the destination and then applies the operation to the copied value. The process 420 then continues the iteration at the 'iterate IR instructions' procedure 423.

Thus, for target computer architectures that use Intel format two-operand instructions, the process 420 transforms all relevant instructions from the IR three-operand form to the Intel format fewer-than-three-operand form. One skilled in the art will understand how to transform IR instructions to single operand instructions such as the FSQRT instruction used with an Intel compatible FPU.

Figure 5A:
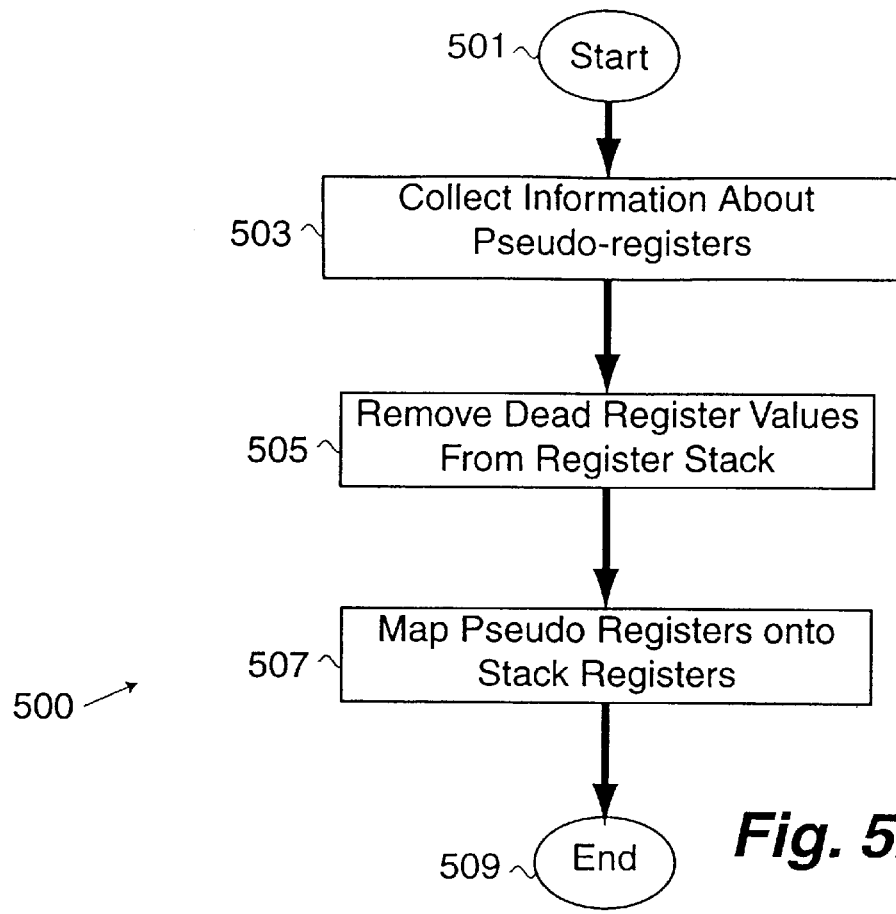
FIG. 5A illustrates a process for transforming instruction accesses from pseudo-registers to stack registers in accordance with a preferred embodiment.

FIG. 5A illustrates a 'transform absolute register references to stack relative references' process, indicated by general reference character 500, for converting IR instruction operands that reference a pseudo-register to IR instruction operands that reference a stack register using a stack offset into the register stack. The process 500 is invoked by the 'transform absolute register reference to stack relative reference' procedure 307 of FIG. 3. The process 500 initiates at a 'start' terminal 501 and continues to a 'collect information about pseudo-registers' procedure 503 that gathers lifetime information about the usage of the pseudo-registers as is subsequently described with respect to FIG. 5B. The lifetime information determines when the value in a register is dead. Next, the process 500 examines the relevant IR instructions (that is, those instructions that access a pseudo-register) to insert or modify instructions that will, when executed, remove dead registers from the register stack. The 'remove dead register from stack' procedure 505 is subsequently described with respect to FIG. 5C. Next, the process 500 continues to a 'map pseudo registers onto stack registers' procedure 507 that replaces the operands that reference pseudo-registers with operands that reference stack registers in the register stack. The 'map pseudo registers onto stack registers' procedure 507 is subsequently described with respect to FIG. 5D. The process 500 completes through an 'end' terminal 509.

Figure 5B:
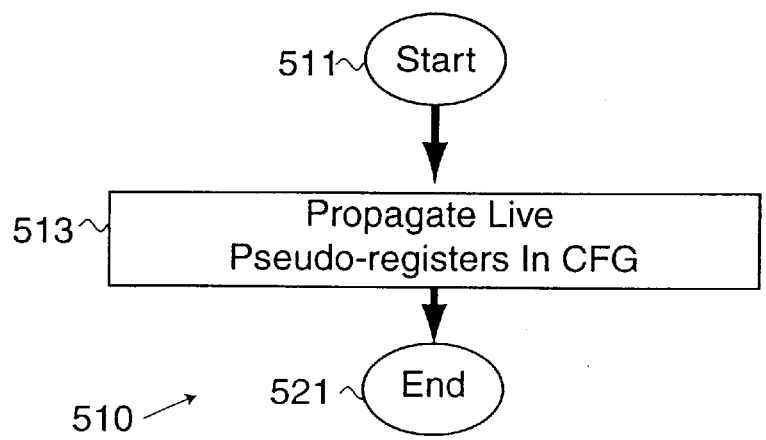
FIG. 5B illustrates a process that optimizes live pseudo-registers represented by a CFG and determines the live pseudo-registers on entry to, and exit from a basic block in accordance with a preferred embodiment.

FIG. 5B illustrates a propagate pseudo-register lifetime process, indicated by general reference character 510, invoked by the 'collect information about pseudo-registers' procedure 503 of FIG. 5A. The process 510 propagates pseudo-register lifetimes in the program represented by the CFG and associated basic blocks. It also determines and saves information about which pseudo-registers are live on entry and exit from each basic block. This information is used to determine the region over which the value in a register is live. Where a register is not live it is called "dead." Lifetime analysis is well known in the art and is described in Aho.

An 'optimize pseudo-registers in CFG' procedure 513 determines which pseudo-registers are live at the entry of each basic block and saves this information as input (block_id). It also determines which pseudo-registers are live at the exit of each basic block and saves this information as output (block_id). The process 510 completes through an 'end' terminal 521.

Figure 5C:
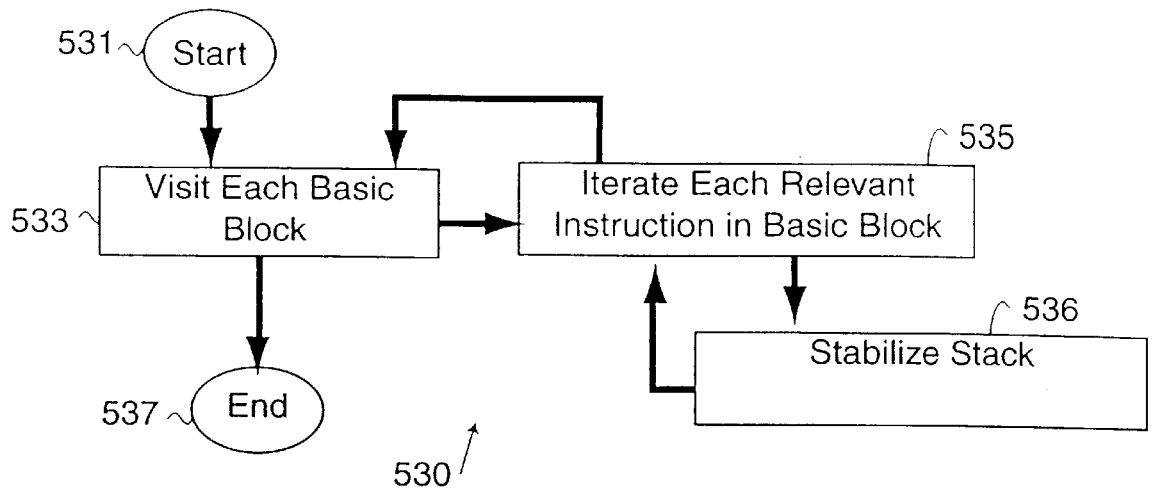
FIG. 5C illustrates an overview of the process for removing dead stack registers from the register stack in accordance with a preferred embodiment.

FIG. 5C illustrates a 'remove dead registers from stack' process, indicated by general reference character 530, for modifying relevant IR instructions so that the stack registers that are associated with dead pseudo-registers will be popped from the register stack when dead. The process 530 is invoked from the 'remove dead register from stack' procedure 505 of FIG. 5A and initiates at a 'start' terminal 531. The process 530 continues to a 'visit each basic block' procedure 533 that visits each basic block in the CFG. The process 530 passes each basic block to an 'iterate each relevant instruction in the basic block' procedure 535 that iterates each instruction in the basic block that accesses one of the pseudo-registers. Once all the instructions in the basic block have been iterated, the process 530 returns to the 'visit each basic block' procedure 533 to process the next basic block. The instruction iterated by the 'iterate each relevant instruction in the basic block' procedure 535 is passed to a 'stabilize stack' procedure 536 that modifies the IR instruction to remove the dead stack register from the stack. This is done by replacing the operation code by a version that does a stack pop to remove the dead value from the stack. Also, one skilled in the art will understand that at this point, the IR instructions do not directly access the register stack. Instead, the IR instructions access the pseudo-registers that will be mapped to the stack registers in the register stack. The 'stabilize stack' procedure 536 is further described with respect to FIG. 6. After all the basic blocks have been processed, the process 530 completes through an 'end' terminal 537. One skilled in the art will understand that modifying the IR instruction to affect the register stack can be done at this point even though the operands of the instruction represent pseudo-registers and not stack registers.

Figure 5D:
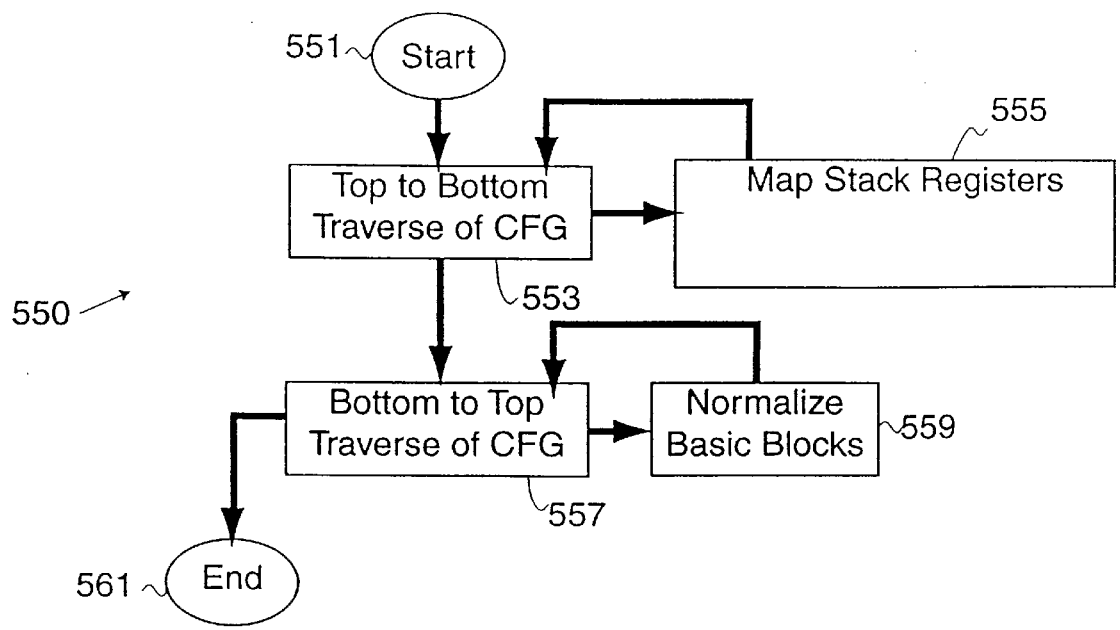
FIG. 5D illustrates an overview of a process to map pseudo-registers to stack registers in accordance with a preferred embodiment.

FIG. 5D illustrates a transform pseudo-register addressing to register stack addressing process, indicated by general reference character 550, that converts the operands of relevant instructions from using pseudo-register references to use register stack offset references. The process 550 also normalizes the register stack between basic blocks connected by the edges of the CFG. The process 550 is invoked by the 'map pseudo registers onto stack registers' procedure 507 of FIG. 5A and initiates at a 'start' terminal 551. The process 550 continues to a 'top to bottom traversal of CFG' procedure 553 that traverses the CFG from the top of the CFG to the bottom of the CFG providing each basic block to a 'map stack register' procedure 555. The 'map stack register' procedure 555 converts the operand(s) of each relevant instruction to a register stack offset instead of a pseudo-register. The 'map stack register' procedure 555 is further described with respect to FIG. 7.

Once the relevant instructions have been converted in each basic block, the process 550 continues to a 'bottom to top traversal of CFG' procedure 557 that traverses the CFG from the bottom to the top and invoking a 'normalize basic blocks' procedure 559 on each edge of the CFG and the edge's associated basic blocks. The 'normalize basic blocks' procedure 559 accomplishes this by inserting instructions, that permute the register stack, into the appropriate basic blocks (or into newly created basic blocks). The 'normalize basic blocks' procedure 559 is subsequently described with respect to FIG. 8A and FIG. 8B. The process 550 completes through an 'end' terminal 561 after the finish of the 'bottom to top traversal of CFG' procedure 557.

As previously discussed, an Intel compatible floating point unit architecture uses one-operand instructions or two-operand instructions for accessing a stack register. This means that one of the instruction's sources is the same as the instruction's target. Thus, one of the source values is destroyed by the execution of the instruction. If both source values need to be preserved across the execution of the instruction, one value must be copied to a temporary register where it can be destroyed by the execution of the instruction. Other computer architectures have similar characteristics and are handled in a similar manner.

Figure 6:
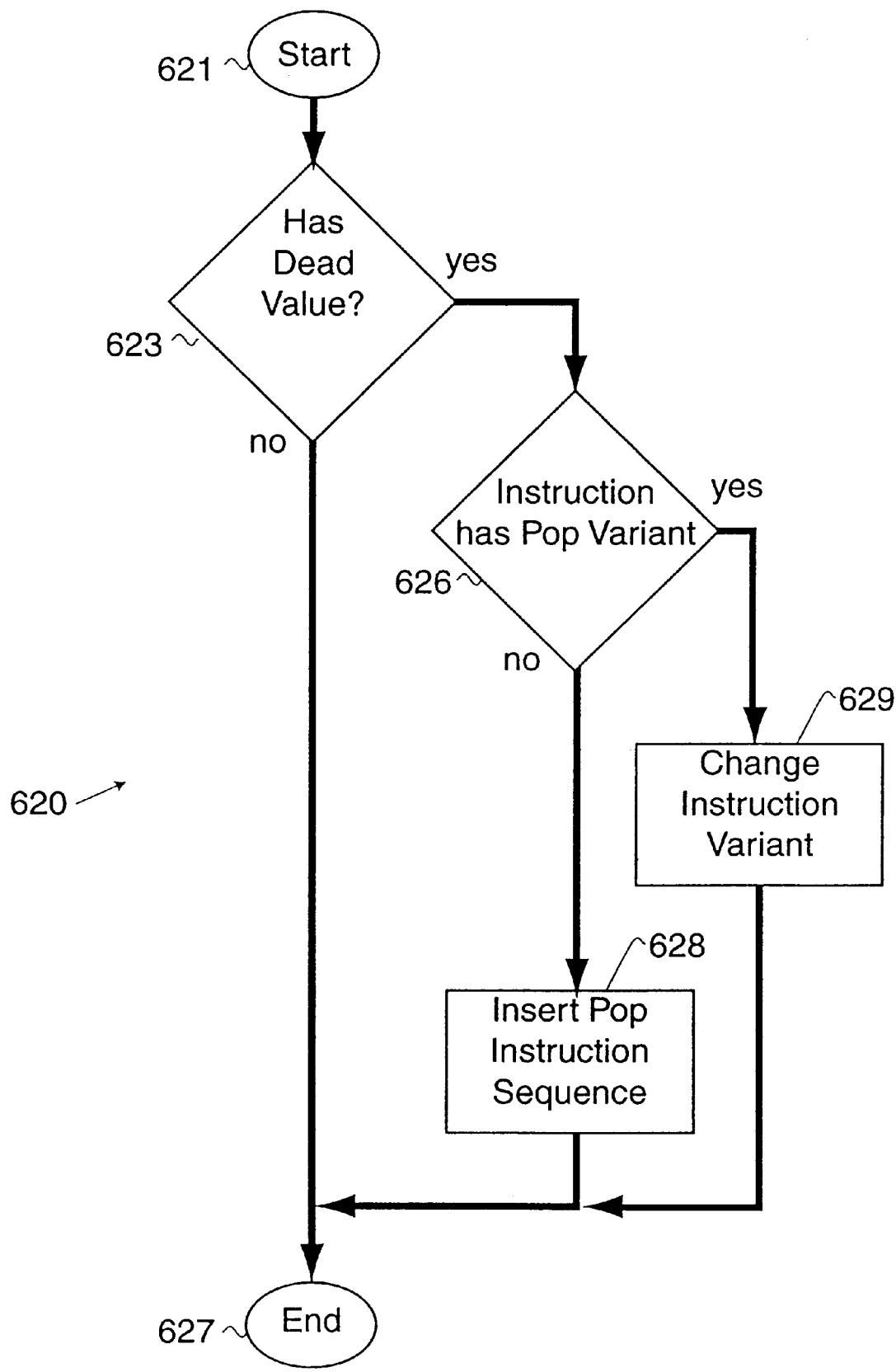
FIG. 6 illustrates a stack stabilization process used to remove dead pseudo-registers from a basic block in accordance with a preferred embodiment.

FIG. 6 illustrates a stack stabilization process, indicated by general reference character 620, used to modify the IR instructions to remove dead pseudo-registers from the register stack. Although the IR still references the pseudo-registers, the IR instruction can be modified to use a stack pop variant of the instruction if the pseudo-register is dead after the execution of the instruction. Specifically a value in a pseudo-register is dead after its last use.

The process 620 initiates at a 'start' terminal 621 and continues to a 'dead value' decision procedure 623. The 'dead value' decision procedure 623 determines whether a pseudo-register referenced by the instruction is dead after the instruction. If so, the process 620 continues to an 'instruction has pop variant' decision procedure 626 that determines if the instruction has a variant or sequence that pops the dead value. If the pseudo-register referenced by the instruction is not dead after the instruction, the process 620 completes through an 'end' terminal 627.

If the 'instruction has pop variant' decision procedure 626 determines that the instruction has a pop variant, the process 620 continues to a 'change instruction variant' procedure 629 that replaces the non-pop instruction variant with a pop instruction variant. If a pop instruction variant does not exist, the process 620 continues to an 'insert pop instruction sequence' procedure 628 that will insert a code sequence to explicitly pop the dead pseudo-register. The process 620 completes through the 'end' terminal 627.

It is useful to now discuss the use of the register stack state. The register stack state provides the mapping between pseudo-registers and the stack registers. Because the stack registers are organized as a register stack, the stack offset to the stack register that contains a particular value changes as other values are pushed onto and popped off of the register stack. The register stack state maps the pseudo-registers to stack registers. One aspect of the invention is the maintenance of the register stack state by tracking the position of values in the register stack as the register stack changes. Consider x=(a+b)*(a+d) making up a portion of a basic block. The IR code from the register allocator would look something like the contents of Table 1:

TABLE 1

| | |
|---|---|
| fld | a -> pr1 |
| fsto | pr1 -> pr2 |
| fadd | pr1, b -> pr1 |
| fadd | pr2, d -> pr2 |
| fmul | pr2, pr1 -> pr2 |
| fsto | pr2 -> X |

Where "prn" indicates pseudo-register "n".

Table 2 illustrates how the pseudo-registers are assigned to stack registers using the register stack state.

TABLE 2

| Inst | operands | F0 | F1 | F2 | F . . . |
|---|---|---|---|---|---|
| fld | a -> F0 | pr1 | pr3 | | ? |
| fsto | F0 -> F2 | pr1 | pr3 | pr2 | ? |
| fadd | F0, b -> F0 | pr1 | pr3 | pr2 | ? |
| fxch | F2, F0 | pr2 | pr3 | pr1 | ? |

TABLE 2-continued

| Inst | operands | F0 | F1 | F2 | F . . . |
|---|---|---|---|---|---|
| fadd | F0, d -> F0 | pr2 | pr3 | pr1 | ? |
| fmul | F2, F0 -> F0 | pr2 | pr3 | pr1 | ? |
| fstop | F0 -> X | pr3 | pr1 | ? | ? |
| . . . | . . . | . . . | . . . | . . . | . . . |

Where "Fn" indicates stack register "n"; "prn" again indicates pseudo-register "n"; the right four columns of Table 2 indicate which pseudo-register is assigned to each stack register; "pr3" is a live pseudo-register that is used by subsequent operations. Notice that "pr2" is considered dead after the store into "X" and so is popped from the register stack. The register stack state maintains an association between each pseudo-register with an offset to a stack register from the top of the register stack. The register stack state is maintained for every instruction. The operand of each instruction that uses a pseudo-register is changed to address the stack register mapped to the pseudo-register by modifying the instruction to use an offset from the top of the register stack. Each offset stored in the register stack state changes as the register stack is permuted by the instructions.

Figure 7:
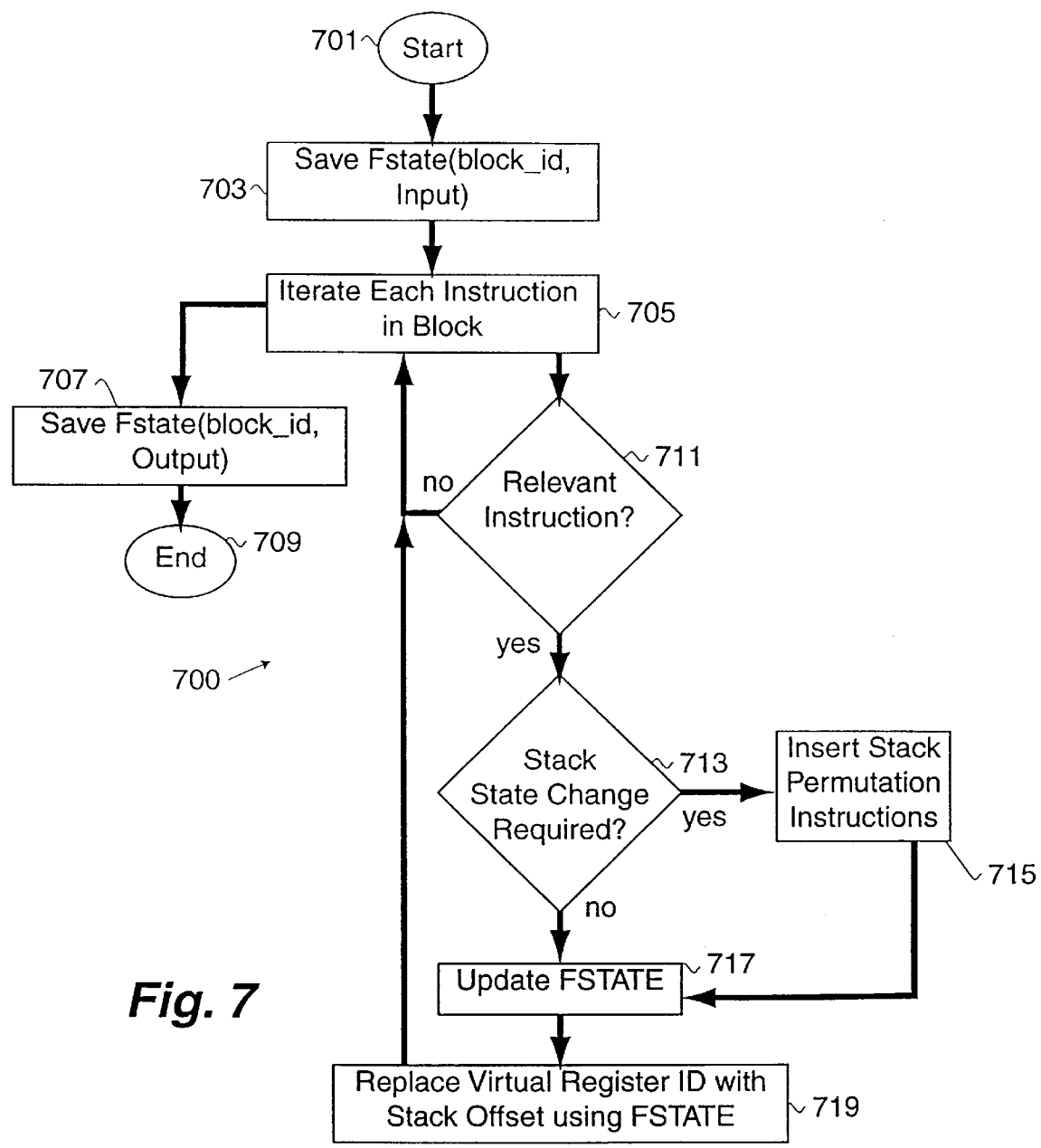
FIG. 7 illustrates a detailed process used to map pseudo-registers from to registers in a register stack in accordance with a preferred embodiment.

FIG. 7 illustrates a pseudo-register mapping process, indicated by general reference character 700, for mapping pseudo-registers to stack registers within the register stack. The process 700 is invoked by the 'map stack register' procedure 555 of FIG. 4A. The process 700 initiates at a 'start' terminal 701 and continues to a 'save initial basic block mapping state' procedure 703. The 'save initial basic block mapping state' procedure 703 initializes the register stack state. The register stack state maps the pseudo-registers to stack registers in the register stack by associating a stack offset value with the pseudo-register. The 'save initial basic block mapping state' procedure 703 saves a copy of the register stack state on entry to the basic block. After the initial basic block register stack state is saved, the process 700 continues to an 'iterate each instruction' procedure 705. The 'iterate each instruction' procedure 705 iterates each instruction in the basic block. After all instructions in the basic block are iterated, the process 700 continues to a 'save final basic block mapping state' procedure 707 that saves the register stack state that exists at the end of the basic block as fstate (block-id, output). The process 700 then completes through an 'end' terminal 709.

The register stack states saved by the 'save initial basic block mapping state' procedure 703 and the 'save final basic block mapping state' procedure 707 are used to normalize the register stack usage between basic blocks as is subsequently described with respect to FIG. 8A.

Each instruction iterated by the 'iterate each instruction' procedure 705 is checked to determine whether the instruction accesses a pseudo-register at a 'floating point register instruction' decision procedure 711. If the iterated instruction does not access a pseudo-register, the instruction is not relevant and the process 700 returns to the 'iterate each instruction' procedure 705 to iterate the next instruction.

However, if the iterated instruction does access a pseudo-register, the process 700 continues to a 'stack state change' decision procedure 713 that determines whether the iterated instruction requires a permutation to the register stack (and the associated register stack state). For example, one such an instruction is the Intel FSQRT instruction that requires that the value to be operated on be stored in the top stack register of the register stack. Thus, if the value of interest is stored in any other stack register, the register stack must be permuted to bring the value of interest to the top of the register stack. If the 'stack state change' decision procedure 713 determines that the iterated instruction requires a stack permutation, the process 700 continues to an 'insert register stack permutation instruction' procedure 715. The 'insert register stack permutation instruction' procedure 715 inserts instructions to place the register stack in a condition appropriate for the iterated instruction. Within an Intel compatible FPU architecture, the 'insert register stack permutation instruction' procedure 715 generally inserts an FXCH instruction to permute the register stack. Next, the register stack state is updated by an 'update mapping state' procedure 717. Thus, the register stack state is responsive to changes in the position of the stack registers in the register stack. Thus, the compiler maintains the state of the register stack responsive to the operation of each instruction that accesses the register stack.

If the 'stack state change' decision procedure 713 determines that the iterated instruction does not require a stack permutation, the process 700 continues to the 'update mapping state' procedure 717. The 'update mapping state' procedure 717 examines the iterated instruction and, if the instruction changes the register stack, the procedure makes the corresponding changes to the register stack state. Thus, the compiler maintains the state of the register stack responsive to the operation of each instruction that accesses the register stack.

Once the register stack state is updated, the process 700 continues to a 'map pseudo-registers to register stack' procedure 719 that uses the information in the register stack state to convert the operands of the iterated instruction from pseudo-registers to stack offsets into the register stack. Thus, the converted instruction references a stack register in the register stack instead of a pseudo-register. Once the iterated instruction is converted, the process 700 repeats the instruction iteration at the 'iterate each instruction' procedure 705 until all instructions in the basic block have been iterated.

The process 700 is invoked for each basic block during a top-down traversal of the CFG. At the end of the top-down traversal of the CFG, the input register stack state and the output register stack state for each basic block has been saved. Additionally, each instruction in the basic block that used pseudo-registers now accesses the register stack using offsets into the register stack.

The remaining step is to match the state of the register stack on exit from a parent basic block to the state of the register stack at the start of the current basic block. This is accomplished by normalizing the blocks during the bottom-to-top traversal of the CFG performed by the 'bottom to top traversal of CFG' procedure 557.

Figure 8A:
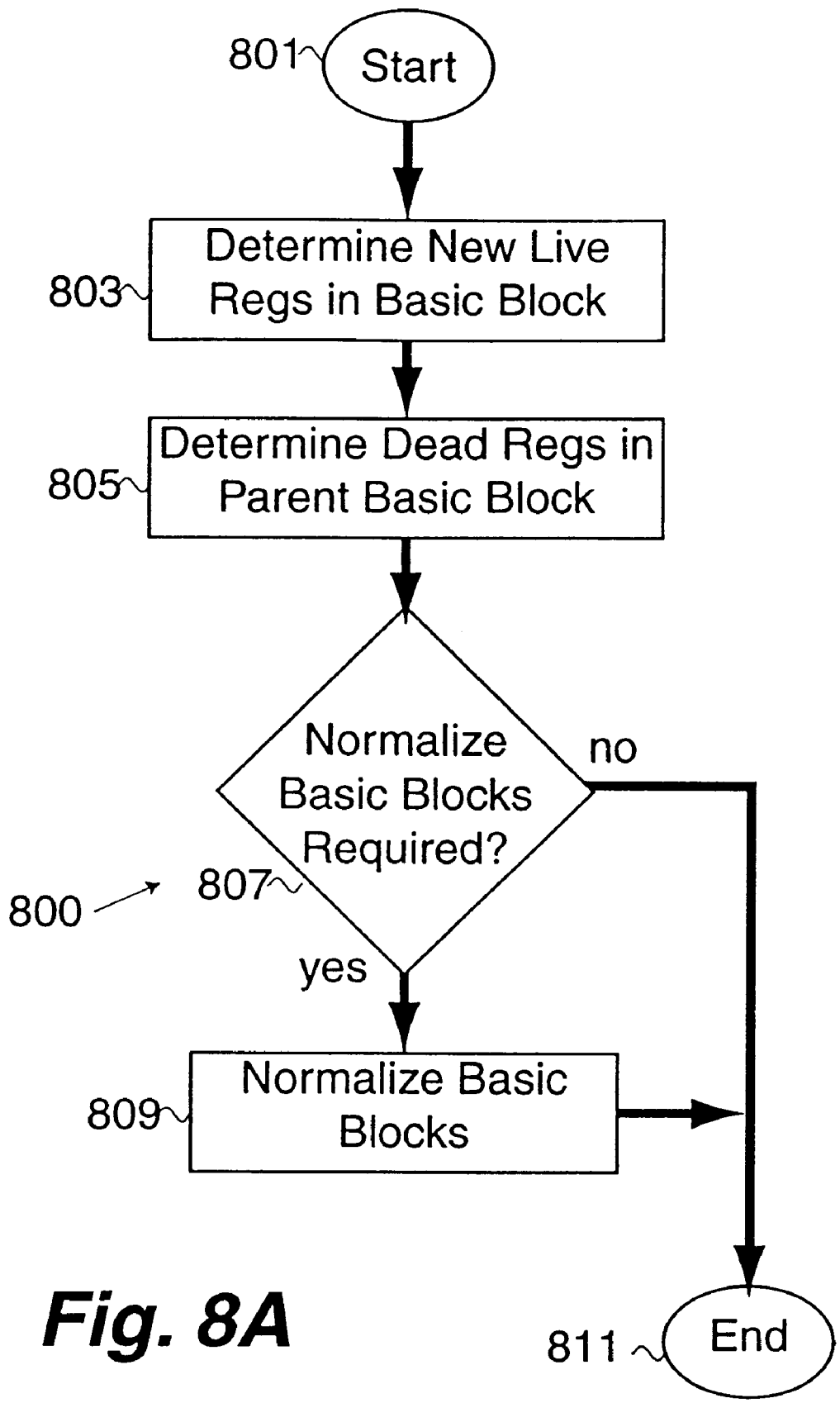
FIG. 8A illustrates an overview of a basic block register stack normalization process in accordance with a preferred embodiment.

FIG. 8A illustrates a basic block register stack normalization process, indicated by general reference character 800, that inserts normalization instructions that normalize the ending register stack usage from a parent basic block (block-j) with the input register stack usage of the current basic block (block-k). Normalization is the process of determining which registers are live entering block-k that are not live on exit from block- and determining which registers are live exiting block-j but are not used in block-k. The process 800 is invoked by the 'normalize basic blocks' procedure 559 as the CFG is traversed in a bottom-to-top manner by the 'bottom to top traversal of CFG' procedure 557. The process 800 initiates at a 'start' terminal 801 and continues to a 'determine new live registers' procedure 803. The 'determine new live registers' procedure 803 compares the exit register stack state from the parent block with the entry register stack state of the current block. Thus, looking at an edge between block-j and block-k in the CFG, the set of new live registers is defined by:

$$Push(block\text{-}j,block\text{-}k)=input(block\text{-}k)-fstate(block\text{-}j,output)$$

In a similar manner, a 'determine dead registers in parent' procedure 805 determines the set of new dead registers on the same edge as defined by:

$$Pop(block\text{-}j,block\text{-}k)=fstate(block\text{-}j,output)-input(block\text{-}k)$$

A 'normalization required' decision procedure 807 examines the push and pop values and the stack permutation required to match the register stack state at the block-j exit with the register stack state at the block-k entry. If normalization is required between block-j and block-k, the process 800 continues to a 'normalize basic block' procedure 809. The 'normalize basic block' procedure 809 inserts instructions that manipulate the register stack such that the block-j exit register stack state is matched with the block-k input register stack state as is subsequently described with respect to FIG. 8B. Then, the process 800 completes through an 'end' terminal 811.

However, if no normalization is required between block-j and block-k, the process 800 completes through the 'end' terminal 811.

Figure 8B:
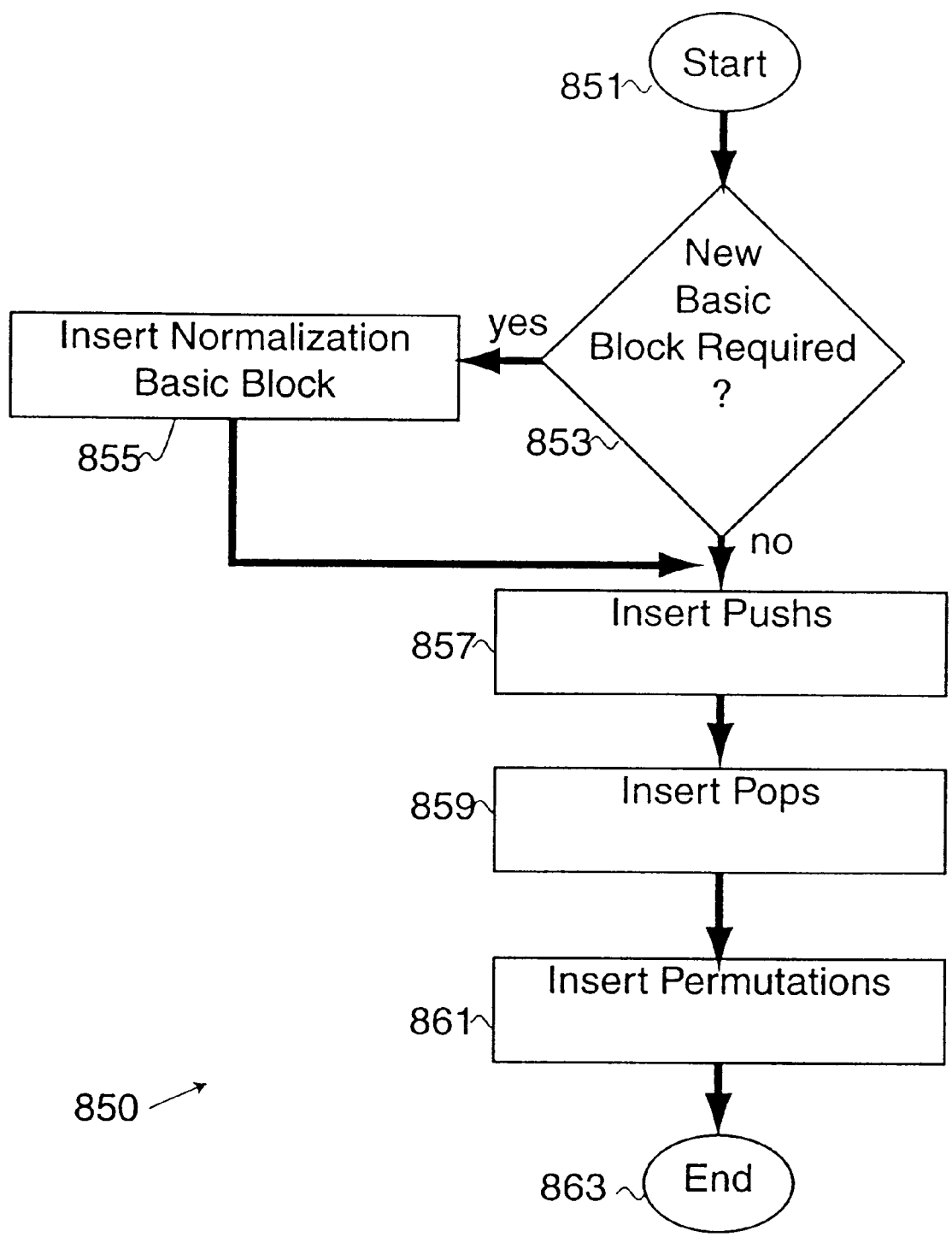
FIG. 8B illustrates a detailed normalization instruction insertion process in accordance with a preferred embodiment.

FIG. 8B illustrates a normalization instruction insertion process, indicated by general reference character 850 that inserts a basic block that normalizes the register stack between block-j and block-k. The process 850 is invoked by the 'normalize basic block' procedure 809 of FIG. 8A. The process 850 initiates at a 'start' terminal 851 and continues to a 'new basic block required' decision procedure 853 that determines whether a new basic block must be inserted into the CFG or whether the register stack normalization can occur within existing basic blocks. A new basic block is not needed if block-k is the only successor to block-j. In this circumstance, the register stack normalization instructions can be inserted directly into block-j. Also, if block-j is the only parent for block-k the normalization instructions can be inserted directly into the beginning of block-k. When these circumstances do not apply, a normalization basic block is inserted into the CFG at an 'insert normalization basic block' procedure 855. The normalization basic block contains instructions that normalize (permute) the register stack exiting from the parent basic block to match the register stack expected on entry to the child basic block. These conditions are illustrated by FIG. 9A and FIG. 9B.

Next, an 'insert register stack push instruction' procedure 857 inserts instructions that push the new live registers (defined by the previously described push definition) onto the register stack. Next, an 'insert register stack pop instruction' procedure 859 inserts instructions that reorder the register stack and instructions that pop dead registers off the register stack. Then, an 'insert register stack permutations' procedure 861 inserts instructions that place the register stack in compliance with the input register stack state for block-k. Next, the process 850 completes through an 'end' terminal 863.

One skilled in the art will understand that the processes of FIG. 8A and FIG. 8B use the register stack states of basic blocks that are connected by edges to normalize the stack register usage between the basic blocks. This normalization includes permuting the register stack so that the live registers in the register stack are at the proper offsets in the register stack for use in the basic block.

Figure 9A:
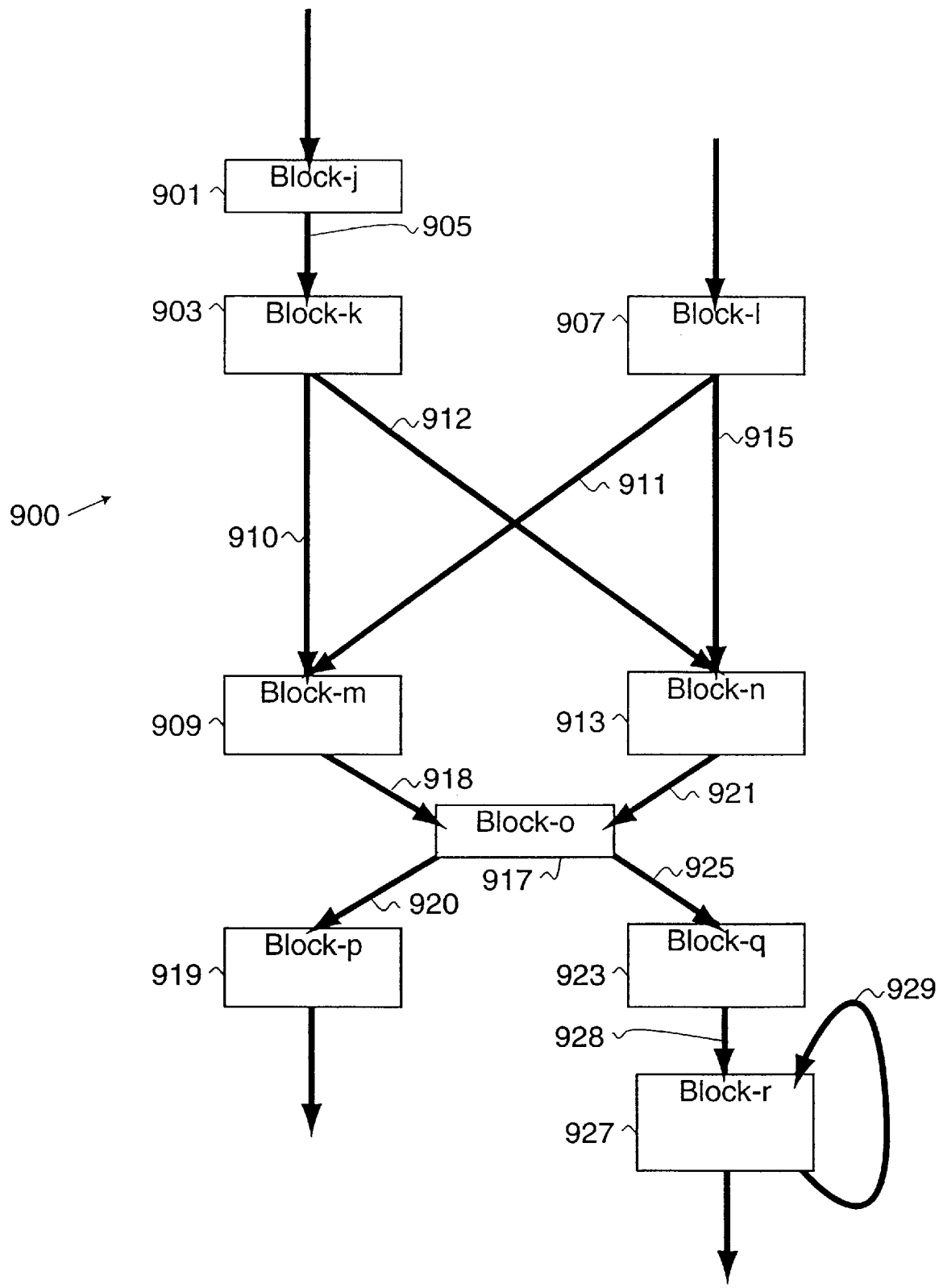
FIG. 9A illustrates a portion of a non-normalized CFG that is operated on in accordance with a preferred embodiment.
Figure 9B:
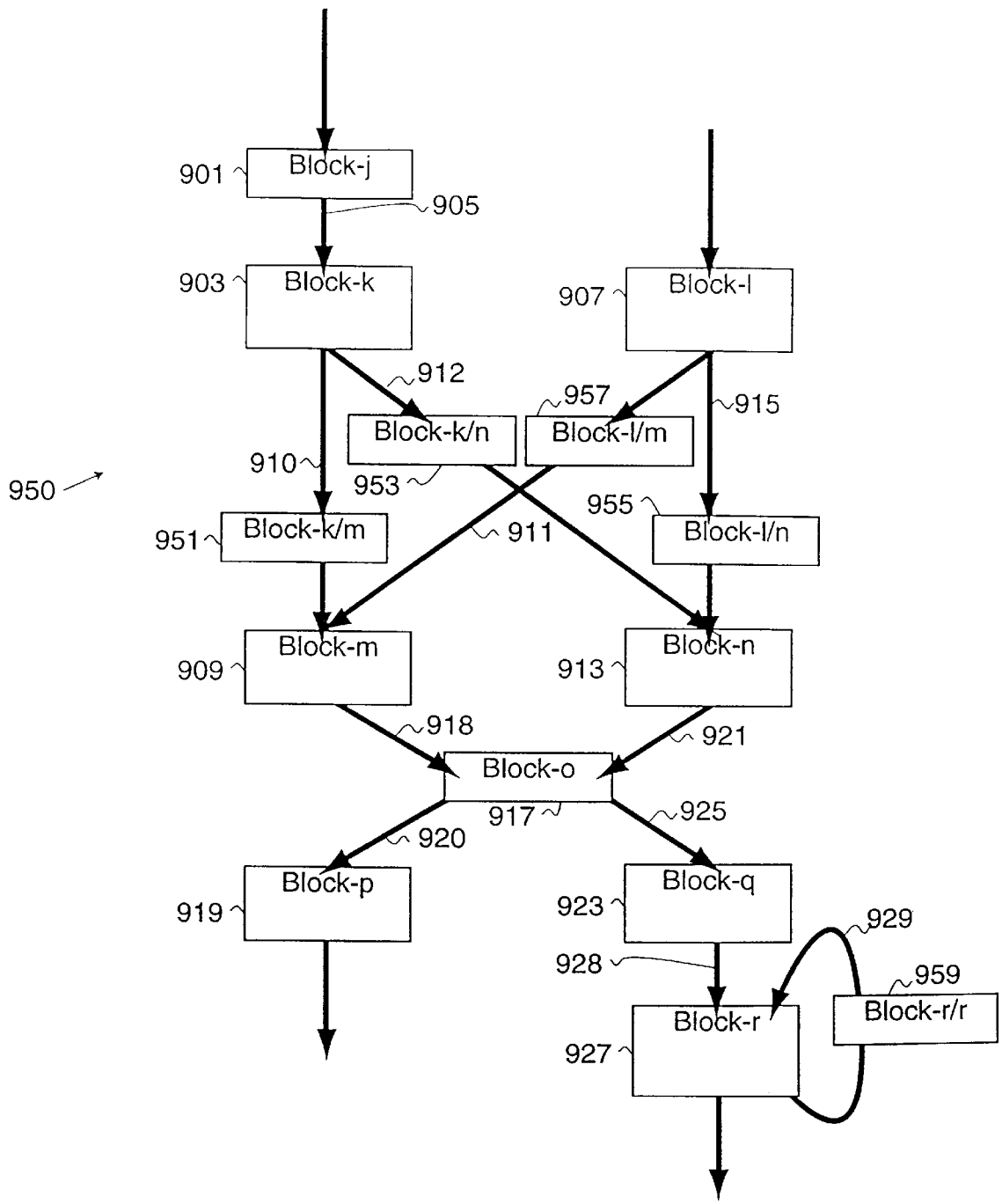
FIG. 9B illustrates a normalized control flow graph resulting from applying a preferred embodiment to the CFG of FIG. 9A.

FIG. 9A illustrates a control flow graph, indicated by general reference character 900 that can be operated on by the invention. The control flow graph 900 includes a block-j 901 that is connected to a block-k 903 by an edge-j/k 905. The block-k 903 connects to a block-m 909 using an edge-k/m 910. In addition, a block-l 907 connects to the block-m 909 by an edge-i/m 911. The block-k 903, via an edge-k/n 912, also connects to a block-n 913. The block-i 907 also connects to the block-n 913 using an edge-i/n 915. The block-m 909 connects to a block-o 917 with an edge-m/o 918. The block-o 917 connects to a block-p 919 with an edge-o/p 920. The block-n 913 also connects to the block-o 917 with an edge-n/o 921. The block-o 917 also connects to a block-q 923 with an edge-o/q 925. The block-q 923 also connects with a block-r 927 with an edge-q/r 928. The block-r 927 also connects to itself by an edge-r/r 929, Examining FIG. 9A one notices that: the block-k 903 is adjacent to the block-j 901; the block-o 917 has two parents (the block-m 909 and the block-n 913) and two children (the block-p 919 and the block-q 923); each of the block-m 909, the block-n 913 and the block-r 927 have two edges entering the top of the block.

FIG. 9B illustrates a normalized control flow graph, indicated by general reference character 950, that results from the operation of the processes illustrated by FIG. 8A and FIG. 8B operating on the control flow graph 900 of FIG. 9A. The control flow graph 900 is altered to insert basic blocks that include normalization instructions for permuting the register stack exiting a parent basic block to that required entering a child basic block. Applying the process 800 of FIG. 8A to the control flow graph 900 notice that:

The block-k 903 is adjacent to the block-j 901—thus, the register stack normalization instructions inserted by the process 850 of FIG. 8B can be inserted within the block-j 901 (the parent block to the block-k 903). The same situation occurs for the following basic block combinations: the block-m 909 and the block-o 917, the block-n 913 and the block-o 917, the block-q 923 and the block-r 927;

The block-o 917 is a parent block to both the block-p 919 and the block-q 923—thus, the register stack normalization instructions (appropriate for each child block) are inserted by the process 850 of FIG. 8B within both the block-p 919 and the block-q 923;

In the general case, the child blocks of the block-k 903 and the block-l 907 (and the loop edge of the block-r 927) each need to have normalization basic blocks inserted into the CFG to normalize the register stack state between the parent and child basic blocks because (in the general case) the normalization instructions cannot be inserted into any of the existing basic blocks (as a basic block does not include execution flow branches). Thus, a block-k/m 951 containing instructions to normalize the register stack between the block-k 903 and the block-m 909 is inserted in the edge-k/m 910. The block-k/m 951 modifies the register stack from the configuration specified by register stack state exiting the block-k 903 to match the input register stack state for the block-m 909. A block-k/n 953, a block-l/n 955, and a block-k/m 957 provide corresponding normalization for their respective edges. Finally, a block-r/r 959 is inserted on the edge-r/r 929 to normalize the exit register stack state of the block-r 927 with the entry register stack state of the block-r 927. One skilled in the art will understand that the normalization blocks need not be inserted onto the CFG edges when the parents exit register stack state coincidentally match the entry register stack state of the child blocks.

One skilled in the art will understand that the invention minimizes the number of stack normalization instructions between basic blocks resulting in a reduced code expansion.

One skilled in the art will understand that the invention allows existing register allocation and optimization techniques to be used with stack registers organized into a register stack.

From the foregoing, it will be appreciated that the invention has (without limitation) the following advantages:

1) The invention minimizes register swapping in the register stack.

2) The invention minimizes possible code expansion resulting from normalizing register stack usage between basic blocks.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein, but should be defined only by the appended claims and equivalents thereof.

What is claimed is:

1. A computer controlled method for efficiently employing a register stack that has a plurality of stack registers within a target computer architecture, said method comprising steps of:
   (a) transforming a three-operand instruction to one or more fewer-than-three-operand instructions;
   (b) analyzing said one or more fewer-than-three-operand instructions to determine lifetime information for one or more pseudo-registers;
   (c) inserting a pop operation into said one or more fewer-than-three-operand instructions dependant on said lifetime information; and
   (d) transforming operand references from said pseudo-registers to offsets in said register stack to reference said plurality of stack registers.

2. The computer controlled method of claim 1 wherein said target computer architecture includes an Intel compatible floating point unit.

3. The computer controlled method of claim 1 wherein step (d) further comprises:
   (d1) mapping said pseudo-registers into said register stack.

4. The computer controlled method of claim 3 wherein step (d1) comprises:
   (d1a) initializing a register stack state at the start of a first basic block;
   (d1b) processing one or more instructions in said first basic block to replace references to said pseudo-registers to offsets in said register stack to access said plurality of stack registers;
   (d1c) inserting one or more register stack permutation instructions in said first basic block as required; and
   (d1d) updating said register stack state corresponding to step (d1b) and step (d1c).

5. The computer controlled method of claim 4 further comprising:
   (d2) determining a set of new live registers that are live registers on entry into a second basic block that were not live on exit from said first basic block;
   (d3) determining a set of new dead registers that are live registers on exit from said first basic block that are not live on entry to said second basic block; and (d4) normalizing register usage between the first basic block and the second basic block by removing said set of new dead registers from said register stack and adding said set of new live registers to said register stack.

6. The computer controlled method of claim 5 further comprising:
(d5) inserting a normalization basic block between said first basic block and said second basic block; and
(d6) inserting one or more normalization instructions into said normalization basic block to normalize register usage between said first basic block and said second basic block.

7. The computer controlled method of claim 5 further comprising:
(d5) inserting one or more normalization instructions into said first basic block to normalize register usage between said first basic block and said second basic block.

8. The computer controlled method of claim 5 further comprising:
(d5) inserting one or more normalization instructions into said second basic block to normalize register usage between said first basic block and said second basic block.

9. A computer controlled method for optimizing a target program directed to a target computer architecture including a register stack that has a plurality of stack registers, said method comprising steps of:
(a) assigning one or more pseudo-registers to said plurality of stack registers;
(b) maintaining a register stack state that maps said assigned pseudo-registers to said plurality of stack registers using a plurality of stack offsets, said register stack state responsive to changes of said register stack; and
(c) converting an instruction that references one of said assigned pseudo-registers to use one of said plurality of stack offsets to specify one of said plurality of stack registers in accordance with said register stack state.

10. The computer controlled method of claim 9 wherein said target computer architecture includes an Intel compatible floating point unit.

11. The computer controlled method of claim 9 wherein step (c) further comprises transforming a three-operand instruction to one or more fewer-than-three-operand instructions.

12. The computer controlled method of claim 9 further comprising:
(d) normalizing said register stack as it exists at exit from a first basic block to match said register stack as it exists on entry to a second basic block.

13. The computer controlled method of claim 12 further comprising:
(d1) adding one or more normalization instructions to said first basic block.

14. The computer controlled method of claim 12 further comprising:
(d1) adding one or more normalization instructions to the second basic block.

15. The computer controlled method of claim 12 further comprising:
(d1) adding a normalization basic block between said first basic block and said second basic block; and
(d2) adding one or more normalization instructions to said normalization basic block.

16. An apparatus having a central processing unit (CPU) and a memory coupled to said CPU for compiling a target program for a target computer architecture employing a register stack that has a plurality of stack registers, said apparatus comprises:
an instruction transformation mechanism configured to transform a three-operand instruction to one or more fewer-than-three-operand instructions; and
a reference transformation mechanism configured to transform operand references contained in said one or more fewer-than-three-operand instructions from one or more pseudo-registers to offsets in said register stack to reference said plurality of stack registers.

17. The apparatus of claim 16 wherein said target computer architecture includes an Intel compatible floating point unit.

18. The apparatus of claim 16 wherein the reference transformation mechanism further comprises:
an information collection mechanism configured to collect information about said pseudo-registers that are live in a first basic block;
an adjustment mechanism configured to adjust said one or more fewer-than-three-operand instructions to keep live values in said register stack; and
a register map mechanism configured to map said pseudo-registers referenced by said one or more fewer-than-three-operand instructions into said register stack.

19. The apparatus of claim 18 wherein the register map mechanism comprises:
a stack state initialization mechanism configured to initialize a register stack state at the start of said first basic block;
an instruction processing mechanism configured to process said one or more fewer-than-three-operand instructions in said first basic block to replace references to said pseudo-registers to offsets in said register stack to access said plurality of stack registers using said register stack state;
a register stack permutation mechanism configured to insert one or more register stack permutation instructions in said first basic block as required; and
a register stack state maintenance mechanism configured to update said register stack state corresponding to the instruction processing mechanism and the register stack permutation mechanism.

20. The apparatus of claim 19 further comprising:
a live register set determination mechanism configured to determine a set of new live registers that are live registers on entry into a second basic block that were not live on exit from said first basic block;
a dead register set determination mechanism configured to determine a set of new dead registers that are live registers on exit from said first basic block that are not live on entry to said second basic block; and
a normalization mechanism configured to normalize register usage between the first basic block and the second basic block by removing said set of new dead registers from said register stack and adding said set of new live registers to said register stack.

21. The apparatus of claim 20 further comprising:
a basic block insertion mechanism configured to insert a normalization basic block between said first basic block and said second basic block; and
a normalization instruction insertion mechanism configured to insert one or more normalization instructions into said normalization basic block to normalize register usage between said first basic block and said second basic block.

22. The apparatus of claim 20 further comprising:
a normalization instruction insertion mechanism configured to insert one or more normalization instructions into said first basic block to normalize register usage between said first basic block and said second basic block.

23. The apparatus of claim 20 further comprising:
a normalization instruction insertion mechanism configured to insert one or more normalization instructions into said second basic block to normalize register usage between said first basic block and said second basic block.

24. An apparatus having a central processing unit (CPU) and a memory coupled to said CPU for optimizing a target program directed to a target computer architecture including a register stack that has a plurality of stack registers, said apparatus comprises:
a register assignment mechanism configured to assign one or more pseudo-registers to said plurality of stack registers;
a maintenance mechanism configured to maintain a register stack state that maps said assigned pseudo-registers to said plurality of stack registers using a plurality of stack offsets, said register stack state responsive to changes of said register stack; and
an instruction reference conversion mechanism configured to convert an instruction that references one of said assigned pseudo-registers to use one of said plurality of stack offsets to specify one of said plurality of stack registers in accordance with said register stack state.

25. The apparatus of claim 24 wherein said target computer architecture includes an Intel compatible floating point unit.

26. The apparatus of claim 24 wherein the instruction reference conversion mechanism further comprises an instruction transformation mechanism configured to transform a three-operand instruction to one or more fewer-than-three-operand instructions.

27. The apparatus of claim 24 further comprising:
a normalization mechanism configured to normalize said register stack as it exists at exit from a first basic block to match said register stack as it exists on entry to a second basic block.

28. The apparatus of claim 27 further comprising:
a normalization instruction insertion mechanism configured to add one or more normalization instructions to said first basic block.

29. The apparatus of claim 27 further comprising:
a normalization instruction insertion mechanism configured to add one or more normalization instructions to the second basic block.

30. The apparatus of claim 27 further comprising:
a basic block insertion mechanism configured to add a normalization basic block between said first basic block and said second basic block; and
a normalization instruction insertion mechanism configured to add one or more normalization instructions to said normalization basic block.

31. A computer program product comprising:
a computer usable storage medium having computer readable code embodied therein for causing a computer to compile a target program for a target computer architecture employing a register stack that has a plurality of stack registers, said computer readable code comprising:
computer readable program code configured to cause said computer to effect an instruction transformation mechanism configured to transform a three-operand instruction to one or more fewer-than-three-operand instructions; and
computer readable program code configured to cause said computer to effect a reference transformation mechanism configured to transform operand references of said one or more fewer-than-three-operand instructions from one or more pseudo-registers to offsets in said register stack to reference said plurality of stack registers.

32. The computer program product of claim 31 wherein the reference transformation mechanism further comprises:
computer readable program code configured to cause said computer to effect an information collection mechanism configured to collect information about said pseudo-registers that are live in a first basic block;
computer readable program code configured to cause said computer to effect an adjustment mechanism configured to adjust said one or more fewer-than-three-operand instructions to keep live values in said register stack; and
computer readable program code configured to cause said computer to effect a register map mechanism configured to map said pseudo-registers referenced by said one or more fewer-than-three-operand instructions into said register stack.

33. The computer program product of claim 32 wherein the register map mechanism comprises:
computer readable program code configured to cause said computer to effect a stack state initialization mechanism configured to initialize a register stack state at the start of said first basic block;
computer readable program code configured to cause said computer to effect an instruction processing mechanism configured to process said one or more fewer-than-three-operand instructions in said first basic block to replace references to said pseudo-registers to offsets in said register stack to access said plurality of stack registers using said register stack state;
computer readable program code configured to cause said computer to effect a register stack permutation mechanism configured to insert one or more register stack permutation instructions in said first basic block as required; and
computer readable program code configured to cause said computer to effect a register stack state maintenance mechanism configured to update said register stack state corresponding to the instruction processing mechanism and the register stack permutation mechanism.

34. The computer program product of claim 33 further comprising:
computer readable program code configured to cause said computer to effect a live register set determination mechanism configured to determine a set of new live registers that are live registers on entry into a second basic block that were not live on exit from said first basic block;
computer readable program code configured to cause said computer to effect a dead register set determination mechanism configured to determine a set of new dead registers that are live registers on exit from said first basic block that are not live on entry to said second basic block; and computer readable program code configured to cause said computer to effect a normalization mechanism configured to normalize register usage between the first basic block and the second basic block by removing said set of new dead registers from said register stack and adding said set of new live registers to said register stack.

35. The computer program product of claim 34 further comprising:

computer readable program code configured to cause said computer to effect a basic block insertion mechanism configured to insert a normalization basic block between said first basic block and said second basic block; and computer readable program code configured to cause said computer to effect a normalization instruction insertion mechanism configured to insert one or more normalization instructions into said normalization basic block to normalize register usage between said first basic block and said second basic block.

36. A computer program product comprising:

a computer usable storage medium having computer readable code embodied therein for causing a computer to optimize a target program directed to a target computer architecture including a register stack that has a plurality of stack registers, said computer readable code comprising:

computer readable program code configured to cause said computer to effect a register assignment mechanism configured to assign one or more pseudo-registers to said plurality of stack registers;

computer readable program code configured to cause said computer to effect a maintenance mechanism configured to maintain a register stack state that maps said assigned pseudo-registers to said plurality of stack registers using a plurality of stack offsets, said register stack state responsive to changes of said register stack; and computer readable program code configured to cause said computer to effect an instruction reference conversion mechanism configured to convert an instruction that references one of said assigned pseudo-registers to use one of said plurality of stack offsets to specify one of said plurality of stack registers in accordance with said register stack state.

37. The computer program product of claim 36 wherein the instruction reference conversion mechanism further comprises computer readable program code configured to cause said computer to effect an instruction transformation mechanism configured to transform a three-operand instruction to one or more fewer-than-three-operand instructions.

38. The computer program product of claim 36 further comprising:

computer readable program code configured to cause said computer to effect a normalization mechanism configured to normalize said register stack as it exists at exit from a first basic block to match said register stack as it exists on entry to a second basic block.

39. The computer program product of claim 38 further comprising:

computer readable program code configured to cause said computer to effect a normalization instruction insertion mechanism configured to add one or more normalization instructions to said first basic block.

40. The computer program product of claim 38 further comprising:

computer readable program code configured to cause said computer to effect a normalization instruction insertion mechanism configured to add one or more normalization instructions to the second basic block.

41. The computer program product of claim 38 further comprising:

computer readable program code configured to cause said computer to effect a basic block insertion mechanism configured to add a normalization basic block between said first basic block and said second basic block; and computer readable program code configured to cause said computer to effect a normalization instruction insertion mechanism configured to add one or more normalization instructions to said normalization basic block.

42. A computer controlled method for efficiently employing a register stack that has a plurality of stack registers within a target computer architecture, said method allowing techniques usable to generate instructions with fixed register names to be used to generate instructions that use said plurality of stack registers said method comprising steps of:

(a) generating a plurality of instructions without push or pop operations whose operands are one or more pseudo-registers with fixed names instead of said plurality of stack registers actually implemented in said target computer architecture;

(b) transforming said plurality of instructions into a plurality of new instructions with an operand format corresponding to that of said target computer architecture's instructions, whereby, for instance, three-operand instructions with two source operands and a target operand are transformed to two-operand instructions with a shared source and target;

(c) analyzing said plurality of new instructions to determine lifetime information for said one or more pseudo-registers;

(d) using said lifetime information to introduce one or more pop operations into said plurality of new instructions, whereby dead values are eliminated;

(e) initializing a mapping means from said one or more pseudo-registers to said plurality of stack registers;

(f) performing the following computer controlled steps for each of said plurality of so new instructions;

(1) replacing within said new instruction said one or more pseudo-registers with one or more of said plurality of stack registers by using said mapping means;

(2) updating said mapping means to reflect the stack effects on said mapping of said new instruction;

whereby said techniques usable to generate instructions with fixed register names are used to generate instructions that use said plurality of stack registers.

43. An apparatus having a central processing unit (CPU) and a memory coupled to said CPU for efficiently employing a register stack that has a plurality of stack registers within a target computer architecture, said apparatus allowing techniques usable to generate instructions with fixed register names to be used to generate instructions that use said plurality of stack registers said apparatus comprising:

an instruction generation mechanism configured to generate a plurality of instructions without push or pop operations whose operands are one or more pseudo-registers with fixed names instead of said plurality of stack registers actually implemented in said target computer architecture;

an instruction transformation mechanism configured to transform said plurality of instructions into a plurality of new instructions with an operand format corresponding to that of said target computer architecture's instructions, whereby, for instance, three-operand instructions with two source operands and a target operand are transformed to two-operand instructions with a shared source and target;

an instruction analysis mechanism configured to analyze said plurality of new instructions to determine lifetime information for said one or more pseudo-registers;

a dead value elimination mechanism configured to use said lifetime information to introduce one or more pop operations into said plurality of new instructions, whereby dead values are eliminated;

an initialization mechanism configured to initialize a mapping means from said one or more pseudo-registers to said plurality of stack registers;

a pseudo-register conversion mechanism configured to convert each of said plurality of new instructions, wherein said pseudo-register conversion mechanism comprises;

an operand replacement mechanism configured to replace, within said new instruction, said one or more pseudo-registers with one or more of said plurality of stack registers by using said mapping means;

an adjustment mechanism configured to update said mapping means to reflect the stack effects on said mapping of said new instruction;

whereby said apparatus incorporates said techniques, usable to generate instructions with fixed register names, to generate instructions that use said plurality of stack registers.

44. A computer program product allowing techniques usable to generate instructions with fixed register names to be used to generate instructions that use a plurality of stack registers comprising:

a computer usable storage medium having computer readable code embodied therein for causing a computer to efficiently employ a register stack that has said plurality of stack registers within a target computer architecture, said computer readable code comprising:

computer readable program code configured to cause said computer to effect an instruction generation mechanism configured to generate a plurality of instructions without push or pop operations whose operands are one or more pseudo-registers with fixed names instead of said stack registers actually implemented in said target computer architecture;

computer readable program code configured to cause said computer to effect an instruction transformation mechanism configured to transform said plurality of instructions into a plurality of new instructions with an operand format corresponding to that of said target computer architecture's instructions, whereby, for instance, three-operand instructions with two source operands and a target operand are transformed to two-operand instructions with a shared source and target;

computer readable program code configured to cause said computer to effect an instruction analysis mechanism configured to analyze said plurality of new instructions to determine lifetime information for said one or more pseudo-registers;

computer readable program code configured to cause said computer to effect a dead value elimination mechanism configured to use said lifetime information to introduce one or more pop operations into said plurality of new instructions, whereby dead values are eliminated;

computer readable program code configured to cause said computer to effect an initialization mechanism configured to initialize a mapping means from said one or more pseudo-registers to said plurality of stack registers;

computer readable program code configured to cause said computer to effect a pseudo-register conversion mechanism configured to convert each of said plurality of new instructions, wherein said pseudo-register conversion mechanism comprises;

computer readable program code configured to cause said computer to effect an operand replacement mechanism configured to replace, within said new instruction, said one or more pseudo-registers with one or more of said plurality of stack registers by using said mapping means;

computer readable program code configured to cause said computer to effect an adjustment mechanism configured to update said mapping means to reflect the stack effects on said mapping of said new instruction;

whereby said product incorporates said techniques, usable to generate instructions with fixed register names, to generate instructions that use said plurality of stack registers.

* * * * *